(12) United States Patent
Curzi et al.

(10) Patent No.: US 11,106,757 B1
(45) Date of Patent: Aug. 31, 2021

(54) FRAMEWORK FOR AUGMENTING DOCUMENT OBJECT MODEL TREES OPTIMIZED FOR WEB AUTHORING

(71) Applicant: Microsoft Technology Licensing, LLC

(72) Inventors: Alessandro Curzi, Dublin (IE); Dinh Doan Van Bien, Dublin (IE); Paul Barnes, Celbridge (IE); Ian Sultanov, Dublin (IE); Andrew Donohoe, Dublin (IE)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 16/877,076

(22) Filed: May 18, 2020

Related U.S. Application Data

(60) Provisional application No. 63/002,296, filed on Mar. 30, 2020.

(51) Int. Cl.
  *G06F 16/957* (2019.01)
  *G06F 40/169* (2020.01)
  *G06F 16/958* (2019.01)

(52) U.S. Cl.
  CPC ........ *G06F 16/9577* (2019.01); *G06F 16/986* (2019.01); *G06F 40/169* (2020.01)

(58) Field of Classification Search
  CPC .. G06F 40/166; G06F 16/9577; G06F 16/986; G06F 40/169
  See application file for complete search history.

(56) References Cited

U.S. PATENT DOCUMENTS

| 2004/0044966 | A1* | 3/2004 | Malone | G06F 40/166 715/255 |
| 2004/0186817 | A1 | 9/2004 | Thames et al. | |
| 2005/0289452 | A1 | 12/2005 | Kashi et al. | |
| 2009/0199083 | A1* | 8/2009 | Sar | G06F 16/9558 715/231 |
| 2010/0011282 | A1* | 1/2010 | Dollard | G06F 40/169 715/233 |
| 2010/0278453 | A1 | 11/2010 | King | |

(Continued)

OTHER PUBLICATIONS

"Non Final Office Action Issued in U.S. Appl. No. 16/876,874", dated Dec. 24, 2020, 12 Pages.

*Primary Examiner* — Asher D Kells
(74) *Attorney, Agent, or Firm* — NovoTechIP International PLLC

(57) ABSTRACT

Techniques for providing writing assistance features a web browser or a native application including an embedded web browser herein include detecting that a webpage has been rendered by the web browser; analyzing a structure of the webpage to determine a topology of the webpage by accessing a Document Object Model (DOM) of the webpage and traversing the DOM of the webpage to identify nodes comprising the webpage to determine the topology of the webpage; construct a model of the webpage based on the topology, wherein the model of the webpage is configured to automatically monitor the topology of the webpage and to update the model based on detected changes to the webpage; detect, using the model, a change in textual content of an input element of the webpage; obtain annotation information associated with the textual content; and render the annotations over at least a portion of the webpage.

20 Claims, 13 Drawing Sheets

(56) References Cited

U.S. PATENT DOCUMENTS

| | | | |
|---|---|---|---|
| 2010/0287132 A1* | 11/2010 | Hauser | G06F 40/174 706/52 |
| 2011/0087686 A1* | 4/2011 | Brewer | G06F 16/3322 707/766 |
| 2011/0113320 A1 | 5/2011 | Neff et al. | |
| 2011/0295851 A1 | 12/2011 | El-Saban et al. | |
| 2012/0297278 A1 | 11/2012 | Gattani et al. | |
| 2013/0031453 A1 | 1/2013 | Griffiths et al. | |
| 2014/0026025 A1 | 1/2014 | Smith et al. | |
| 2014/0075281 A1 | 3/2014 | Rubin | |
| 2014/0089775 A1 | 3/2014 | Worsley | |
| 2014/0223284 A1 | 8/2014 | Rankin et al. | |
| 2014/0279793 A1 | 9/2014 | Wohlstadter | |
| 2014/0281875 A1 | 9/2014 | Branton et al. | |
| 2016/0188686 A1 | 6/2016 | Hopkins et al. | |
| 2016/0350437 A1 | 12/2016 | O'Donnell | |
| 2018/0107689 A1 | 4/2018 | Grossman et al. | |
| 2018/0144133 A1 | 5/2018 | Hoover et al. | |
| 2019/0205372 A1 | 7/2019 | Li et al. | |
| 2019/0362403 A1 | 11/2019 | Chow | |
| 2020/0004809 A1 | 1/2020 | Tene | |
| 2020/0174630 A1 | 6/2020 | Rosenberg | |
| 2020/0265060 A1 | 8/2020 | Crapo et al. | |
| 2020/0293607 A1 | 9/2020 | Nelson et al. | |
| 2020/0293712 A1 | 9/2020 | Potts et al. | |
| 2020/0364294 A1 | 11/2020 | Brown et al. | |

* cited by examiner

FRAMEWORK FOR AUGMENTING DOCUMENT OBJECT MODEL TREES OPTIMIZED FOR WEB AUTHORING

CROSS-REFERENCE TO RELATED APPLICATION

This application claims the benefit of priority to U.S. Provisional Patent Application No. 63/002,296, filed on Mar. 30, 2020 and entitled "Framework for Augmenting Document Object Model (DOM) Trees Optimized for the Web Authoring," the entirety of which is incorporated by reference herein in its entirety.

BACKGROUND

Robust tools have been developed to provide advanced writing assistance to users of document editing applications. The advanced writing assistance may include performing spell checks on document contents, grammar checking the documents contents, and/or style-checking the document contents. These tools may significantly enhance the user experience by helping the user to improve their writing. Such tools are typically limited to specific applications installed on a computing device. However, users are accessing and editing more and more content online, such as email, social media content, blogs, and/or other online content. Furthermore, document editors and other types of tools that were traditionally applications installed on the user's computing device have migrated online. As a result, users are accessing and editing a wide variety of content online. Some tools exist for providing limited writing assistance to users of such online content, but these tools may be tailored to a specific website or only provide limited assistance. There are significant areas for new and approved mechanisms for providing such advanced writing assistance tools to web-based content.

SUMMARY

An example data processing system according to the disclosure may include a processor and a computer-readable medium storing executable instructions. The executable instructions may cause the processor to perform operations including detecting that a webpage has been rendered by a web browser; analyzing a structure of the webpage to determine a topology of the webpage by accessing a Document Object Model (DOM) of the webpage and traversing the DOM of the webpage to identify nodes comprising the webpage to determine the topology of the webpage; construct a model of the webpage based on the topology of the webpage, wherein the model of the webpage is configured to automatically monitor the topology of the webpage and to update the model based on detected changes to the webpage; detect, using the model, a change in textual content of an input element of the webpage; obtain annotation information associated with the textual content on the webpage; and render the annotations over at least a portion of the webpage displayed by the web browser.

An example method for providing writing assistance features in a web browser or native application including an embedded web browser according to the disclosure may include detecting that a webpage has been rendered by the web browser; analyzing a structure of the webpage to determine a topology of the webpage by accessing a Document Object Model (DOM) of the webpage and traversing the DOM of the webpage to identify nodes comprising the webpage to determine the topology of the webpage; construct a model of the webpage based on the topology of the webpage, wherein the model of the webpage is configured to automatically monitor the topology of the webpage and to update the model based on detected changes to the webpage; detect, using the model, a change in textual content of an input element of the webpage; obtain annotation information associated with the textual content on the webpage; and render the annotations over at least a portion of the webpage displayed by the web browser.

An example memory device according to the disclosure stores instructions that, when executed on a processor of a data processing system, cause the data processing system to provide writing assistance features in a web browser or a native application including an embedded web browser, by: detecting that a webpage has been rendered by the web browser; analyzing a structure of the webpage to determine a topology of the webpage by accessing a Document Object Model (DOM) of the webpage and traversing the DOM of the webpage to identify nodes comprising the webpage to determine the topology of the webpage; construct a model of the webpage based on the topology of the webpage, wherein the model of the webpage is configured to automatically monitor the topology of the webpage and to update the model based on detected changes to the webpage; detect, using the model, a change in textual content of an input element of the webpage; obtain annotation information associated with the textual content on the webpage; and render the annotations over at least a portion of the webpage displayed by the web browser.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for providing writing assistance features for web-based content are provided. The technical problem addressed by the techniques disclosed herein is that few tools exist for that for assisting users in improving writing in webpage and/or other web-based content and the few tools that do exist only support limited functionality may be used with a limited number of webpages and/or other web-based content. The technical solution by the techniques in the instant application is to provide, in a web browser or a native application utilizing WebView to embed web browser functionality, writing assistance features (WAF) for a webpage or other web-based content for which the content and structure of the webpage or other web content may be unknown. The technical solution may include a WAF plug-in or extension to the browser that can analyze the structure of the webpage or other web-based content to determine the structure of the content. The WAF plug-in or extension may identify textual elements of the content, which the user may add, delete, or modify, and monitor these elements for changes in the content. Furthermore, the WAF plug-in or extension may provide assistive features, such as but not limited to spell-check, grammar checking, and/or style checking. Textual content extracted from the webpage or other content can be sent to a remote server for analysis, and the remote server can provide annotations associated with the textual content to the WAF plug-in or extension. The annotations may represent spelling suggestions, grammar suggestions, stylistic suggestions, and/or other such edits that may be displayed to the user and applied to the textual content of the webpage or other web-based content. The technical benefits of the techniques disclosed in the instant application include providing writing assistive features for any website or web-content that does not require advance knowledge of the layout of the content or the website. The writing assistive features automatically adapt to layout of the website or web-based content and provide the writing assistive features to the user without negatively impacting the usability of the website or web-based content.

Figure 1:
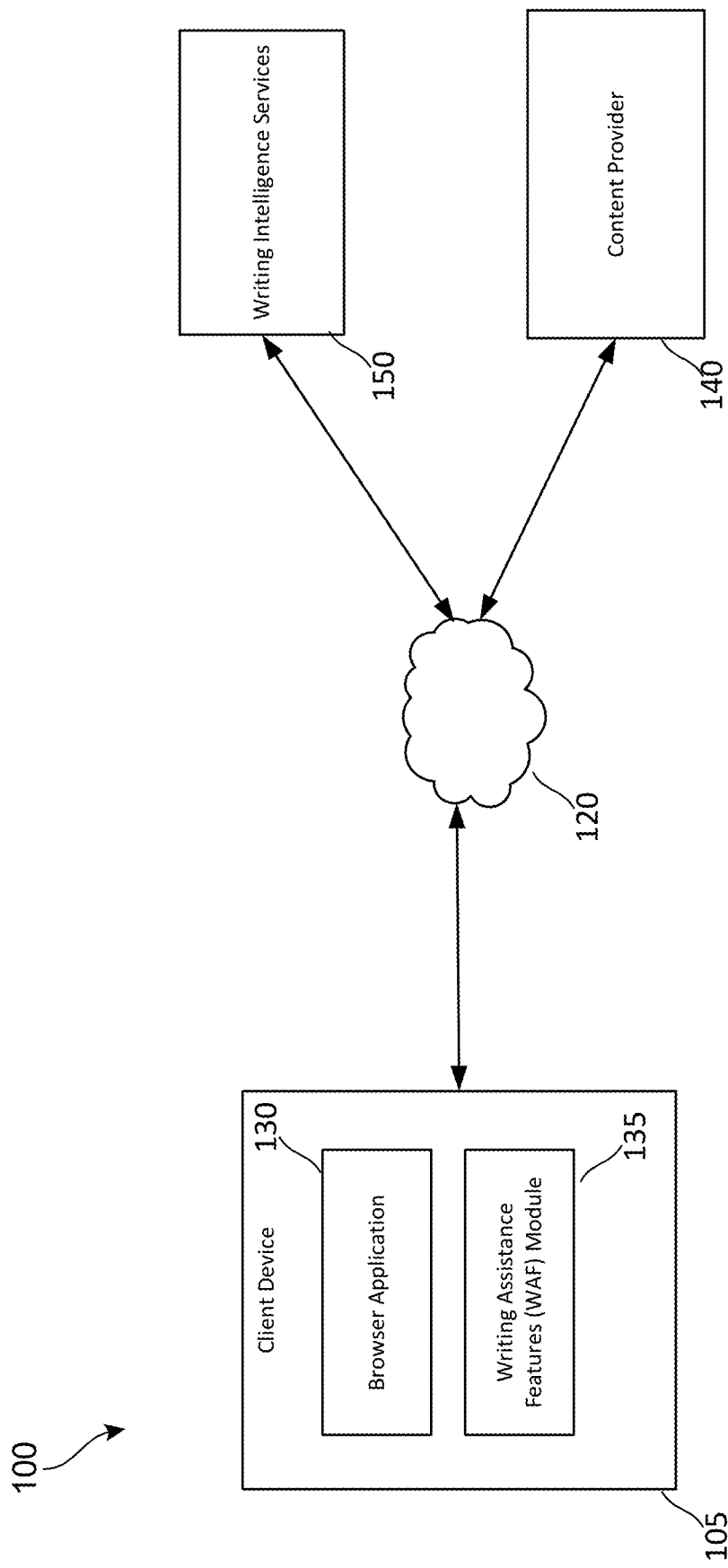
FIG. 1 shows an example computing environment in which the techniques disclosed in the instant application may be implemented.

FIG. 1 shows an example computing environment 100 in which the techniques disclosed herein may be implemented. The computing environment 100 may include the client device 105, a network 120, content provider 140, and writing intelligence services 150. The network 120 may include one or more public and/or private networks and may be implemented, a least in part, by the Internet.

The client device 105 is a computing device that may be implemented as a portable electronic device, such as a mobile phone, a tablet computer, a laptop computer, a portable digital assistant device, a portable game console, and/or other such devices. The client device 105 may also be implemented in computing devices having other form factors, such as a vehicle onboard computing system, a video game console, a desktop computer, and/or other types of computing devices.

The editor services 150 may be configured to provide writing assistance features WAF services such as spell checking, grammar checking, style checking of contents of a document. The editor services 150 may be configured to receive textual content of a document from a remote computing device, such as the client device 105, via the network 120. The editor services 150 may be configured to analyze the textual content received from the remote computing devices and to provide suggestions to correct spelling and/or grammar errors in the textual content receive. The editor services 150 may also provide stylistic suggestions that the user may help the user to improve his or her writing. The editor services 150 may provide WAF services for word processing applications, social media applications, communications platform applications, email applications, and/or other applications in which a user may edit textual content that may benefit from the WAF services. Such applications may integrate support for the WAF services to into the application to facilitate providing WAF services to the users of these applications automatically. The application may be configured to automatically perform spelling, grammar, and/or stylistic checks on the content being edited and/or viewed in the application. The application may also be configured to perform such checks on demand by a user.

Application providers may integrate the WAF services provided by the editor services 150 into their applications. However, there remains a vast market for such services for web-based content, such as that provided by the content provider 140. But providing WAF services to web-based content presents special challenges, as the websites and/or web applications provided by the content provider 140 may not integrate the WAF services directly. The lack of such integration can be overcome using the techniques disclosed in the instant application by integrating the WAF services into a browser extension or browser plug-in of a browser application that may be used to access web content or into a native application with embedded web browser functionality. The WAF services, which will be discussed in greater detail in the examples that follow, may be configured to automatically adapt to any webpage or web-based content accessed in the browser application without having advanced knowledge of the structure and/or contents of the webpage or web-based content. The WAF services disclosed herein may analyze a web page or other web-based content and The content provider 140 may be configured to provide webpages, web-based applications, and/or other content to remove client devices, such as the client device 105. The web-based content may include static content that may not be edited by the user of the computing device 105, editable content that may be modified and/or created at least in part by the user, or a combination thereof. The web-based content may be email, social media content, blog-related content, and/or other online content. Furthermore, the content provider 140 may provide one or more online tools for creating and/or editing content via a user interface rendered by the browser application 130. For example, the content provider 140 may generate content in HTML and/or other types of markup language that may be rendered in the browser application 130. Furthermore, the content provider may provide "software as a service" (SaaS) in which one or more cloud-based applications may be accessed via a browser application on a computing device. While the example implementation illustrated in FIG. 1 only includes a single content provider, other implementations may include numerous content providers that may provide a variety web-based content to users.

The client device 105 may include a browser application 130 that may be used to access web-based content from a content provider 140 via the network 120. The client device 105 may also include a writing assistance features WAF module 135. The WAF 135 may be implemented as a plug-in or an extension to the browser application 130. A browser extension or browser plug-in as used herein may refer to an executable software module that may be used to provide writing assistance features to a user of the computing device. In some implementations, a browser extension may be executable program code that is executed by the browser while a plug-in may be executable object code. In other implementations, the techniques disclosed in the instant application may be implemented in a native application that implements WebView to allow the native application to access content online. In such a native application information, some or all of the functionality associated with the WAF module 135 may be implemented by the native application. In other implementations, the WAF module 135 may be implemented as an embeddable module and may interact with content accessed by the application using WebView.

The WAF module 135 may be provided by or associated with the writing intelligence services 150. The writing intelligence services 150 may be implemented on one or more servers and be accessed by the WAF module 135 via the network 120. The WAF module 135 may be configured to work with the writing intelligence services 150 to provide various writing assistance features to the user of the browser application 130. For example, the WAF module 135 may be configured to analyze web content of the content provider 140 accessed by a user via the browser application 130. The WAF module 135 augments the web-based content provided by the content provider 140, but the WAF module 135 is not associated with the content provider 140 and does not have direct access to manipulate the web-based content provided by the content provider 140. As a result, the WAF module 135 may analyze the structure of the web-based content provided by the content provider 140 and track how the web-based content changes over time. The WAF module 135 may be configured to analyze the Document Object Model (DOM) of the web-based content received from the content provider 140 in order to identify and monitor textual components of the web-based content that may be edited by a user of the content and to provide writing assistance functions related to these textual components. The DOM provides an application programming interface (API) that defines a logical structure of an HTML or XML document and provides functions for accessing and manipulating the content of the document. The DOM provides functions for adding, modifying, and deleting elements from the DOM. The WAF module 135 uses the DOM to understand the structure of the web-based content received from the content provider 140, to track changes in the content over time, and to implement writing assistance functionality as will be described in greater detail in the examples implementations that follow. The WAF module 135 is implemented to not interfere with the structure of the DOM so that the original user experience provided by the content provider 140 is not negatively impacted while providing the various writing assistance functions that can improve the user experience. The WAF module 135 does not need to know the structure or layout of a website or other web-based content in advance in order to provide the WAF services.

Figure 2:
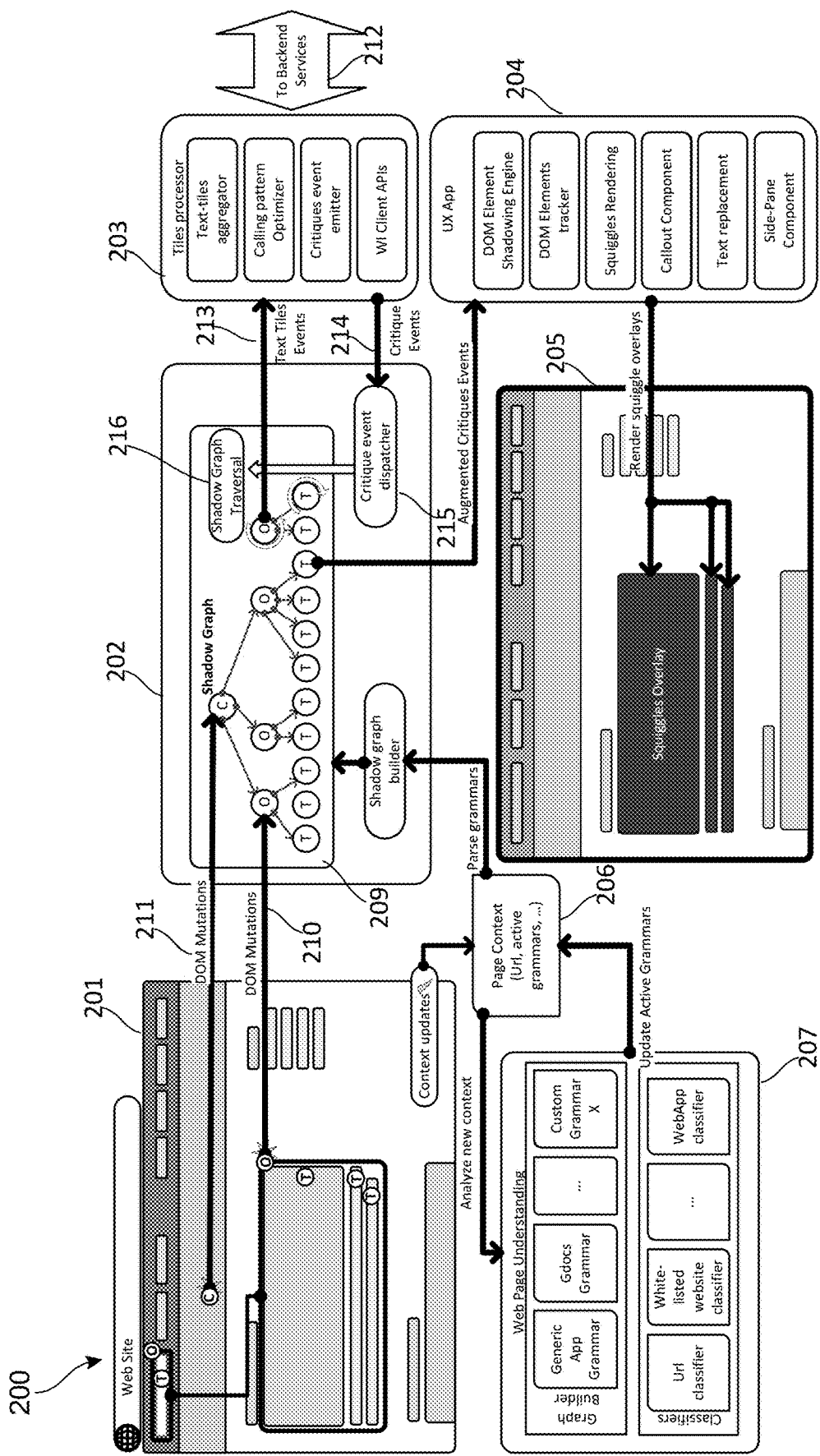
FIG. 2 is a diagram that shows additional elements of the writing assistance features (WAF) module of the client device of FIG. 1.

FIG. 2 is a diagram 200 that shows additional elements of the WAF module 135 that may be used to provide WAF services to a to user of a webpage 201. In the example implementation illustrated in the FIG. 2, the webpage 201 is accessed in the browser application 130. The webpage 201 may be accessed by typing a Universal Resource Locator (URL) into the an address bar of the browser application 130, by clicking a link from another webpage or other web-based content, or by clicking a link in an electronic document or email that is external to the browser application 130.

FIG. 2 illustrates how the WAF module 135 may provide the WAF services to the user of the webpage 201 without having advance knowledge of or control over the contents of the webpage 201. To facilitate providing the WAF services for the webpage 201, the WAF module 135 constructs a model of the webpage 201 referred to herein as a shadow graph 209. The shadow graph 209 is an organized and self-updating structure that represents a subset of the elements of the web page 201. The WAF module 135 may analyze the structure of the DOM of the webpage 201 using various functions of by an Application Programming Interface (API) of the DOM to traverse the structure of the webpage 201. The shadow graph 209 represents a subset of the structure of the DOM of the webpage 201. The WAF 135 may identify editable nodes in which a user may add, modify, and/or delete textual content while traversing the DOM of the webpage 201 and a representation of these editable nodes as a node in the shadow graph 209.

The webpage 201 may be provided by a content provider 140 which is not associated with and may not even have knowledge of the WAF module 135. Because the WAF module 135 does not "control" the webpage 201, the WAF module 135 may not be permitted to manipulate the contents of the webpage 201. This presents a difficult technical problem when providing WAF services to a user of such a webpage, because the WAF module 135 may not be able directly manipulate or analyze the webpage. However, the WAF module 135 provides a solution to this technical problem by constructing the shadow graph 209 which includes the contents of editable nodes, such as text fields, text areas, content editable nodes, and/or other elements which a user may manipulate. The WAF module 135 extracts the contents of these editable nodes using functions provided by the API of the DOM of the webpage 201 and creates a node or nodes in the shadow graph 209 that represent these editable nodes. The nodes of the shadow graph may be linked back to the corresponding DOM objects of the webpage 201, and the text contents of the corresponding DOM objects may be monitored in order to keep the contents of the shadow graph up to date. The API of the DOM may also provide functions that allow the nodes of the shadow map 209 to monitor various events that are indicative of the contents of the textual content associated with that element having been modified or potentially having been modified, which may trigger the nodes to extract the current textual content of the editable node that the nodes represent. In this way, the shadow graph 209 may automatically keep itself up to date with the current contents of the webpage 201. The construction of the shadow graph will be discussed in greater detail in the examples that follow.

The WAF 135 may be configured to monitor the browser application 130 for various types of context updates that indicate that the webpage 201 has been accessed and/or changes to the contents of the webpage 201 may have occurred that would require a new shadow map 209 of the webpage 201 to be constructed. Context updates are high-level signals that include information about the webpage 201 and/or changes to the webpage 201. One such context signal that the WAF 135 may utilize is to monitor for changes in the URL that has been accessed by the browser application 130, which is indicative that the webpage 201 may have changed. The WAF 135 may also be configured to monitor for the occurrence of other types of context signals associated with various trigger events that may be indicative of the webpage having changed or webpage has refreshed and the underlying structure of the webpage 201 may have changed.

The WAF module 135 may maintain a page context module 206, which may store various context information that may be used to facilitate building and maintaining the shadow graph 209. The page context module 206 may be stored in a memory of the computing device upon which the browser application 130 is being executed and may be accessible and/or updatable by various components of the WAF module 135. The page context module 206 may be notified by the WAF module 135 that a triggering event has occurred in which the shadow graph 209 may need to be initialized. The page context module 206 may be provided a URL of the webpage 201 and additional information about the webpage 201. This additional information may include information, such as but not limited to the document type represented by the URL and/or the markup language used to create the content associated with the URL.

The page context object 206 may be configured to provide the page context information to the webpage understanding module (WUM) 207. The WUM 207 may maintain a set of one or more classifiers and one or more graph builder grammars. The classifiers may include a set of rules that may be executed to on information currently known about the webpage 201 by the page context module 206 to determine whether the WAF module 135 may be utilized with the webpage 201 and to select a set of context free grammars or rules that may be used to parse the contents of the DOM of the webpage 201 to obtain the information to generate the shadow graph 209. The classifiers may include rules to act as a set of filters. For example, a first set of websites or domains may be whitelisted, which in this context means that the WUM 207 should attempt to process the webpage 201. Conversely, a second set of websites may be blacklisted, which in this context means the WUM 207 should not continue processing webpage 201. The rules may be customized based on types of webpage 201. For example, the classifiers may be configured to allow processing to occur for social media websites, but not for a site related to online homework or testing for schools or universities. The online education sites may be barred from analyzed and for providing recommendations and/or suggestions on spelling, grammar, and/or style to students using those sites so that the students so that the students' work may be assessed without such assistance.

The classifiers may also be used to select a set of graph builder grammars to be used to model the webpage 201 and to construct the shadow graph 209 based on the structure of the webpage 201. The classifiers may select a particular set of graph builder grammars based on, for example, a type of document represented by the webpage 201. For example, if the webpage 201 is a .gdoc file associated with Google Documents Files, a classifier may select a set of ".gdoc" graph builder grammars that is configured to extract relevant data from that type of document format. The classifiers may also be configured to select a generic set of graph builder grammars for parsing the webpage 201 if no classifier triggers based on the file format and selects a specific grammar to be applied to the webpage 201.

A set of graph builder grammars includes a descriptive set of rules that may indicate which types of markup language elements of the DOM are of interest for inclusion in the shadow graph 209. These markup language elements of the DOM typically are HTML or XML elements but may be other types of markup language elements depending on the implementation of the webpage 201 or other web-based content that has been accessed using the browser application 130. The rules of the grammars define which markup language elements to look for in the DOM tree to support the shadow graph 209. If a grammar rule identifies a markup language element of interest that represents an editable node, at least one node is created for the that editable node in the shadow graph 209 which may be kept synchronized with the corresponding editable node in the DOM of the webpage 201. The node will monitor the DOM for events indicative of the content of the editable node being modified and extract the current textual content of the editable node to update the node of the shadow graph 209 as discussed in the examples that follow.

The graph builder grammars may be customizable by the user, and the graph builder grammars may be customized for different types of documents. The WUM 207 may be configured to select a default graph builder grammar for processing HTML and/or XML documents if the classifiers have not selected a particular grammar to be applied to the web page 201. Once the grammar is selected the WUM 207 may provide the grammar information to the page context object 206, and the page context object 206 may trigger the building of a shadow graph 209.

The graph builder grammar from the WUM 207 may be provided to the shadow graph builder 208 of the proofing DOM module 202. The shadow graph builder 208 parse the grammars and use the parsed rules to control the generation of the shadow graph 209. The rules may indicate how to traverse the DOM and how to extract the relevant nodes. A rule may build a subtree of the shadow graph 209 that comprises one or more nodes. Each node in the shadow graph 209 may be configured to monitor events associated with the DOM element in the webpage 201 corresponding to that element. This monitoring may be implemented through callbacks to the DOM. The DOM of the webpage 201 exposes an API that allows the shadow graph 209 to listen for "DOM mutations" that represent changes to the corresponding DOM element or subtree.

The shadow graph 209 illustrated in FIG. 2 includes a three-tiered structure, but other implementations may utilize a different structure for representing the DOM of the webpage 201. The top-level node is a "content" node that corresponds to the webpage 201. Below this top-level node are "outline" nodes that correspond to a particular class of elements, such as a text input field or a text box. Each outline node may be associated with one or more "terminal" nodes that have a one-to-one mapping to a root content element. A root content element is an editable node of the webpage 201 that may contain text. The text associated with the root content element may vary in length. For example, the text may be a single work, a phrase, a full sentence, a paragraph, or may be a lengthier section of text. Because the WAF module 135 does not really have control over the contents of the webpage 201, the text associated with the root content element may be analyzed and may be broken down into meaningful chunks or content units referred to as "tiles" that may be monitored for changes by the terminal nodes.

Figure 10:
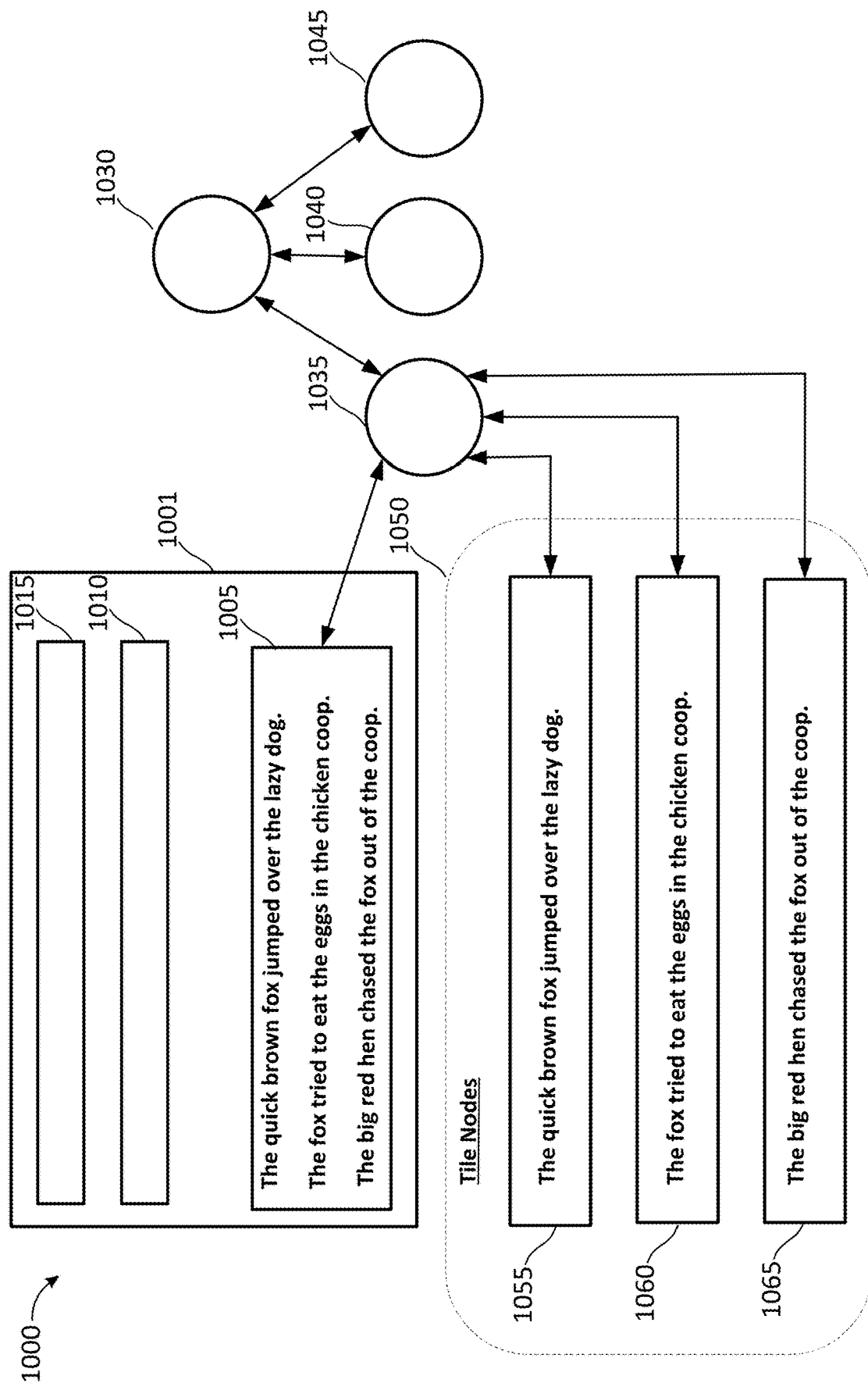
FIG. 10 is a diagram that illustrates how an outline node and a set of terminal nodes may be generated based on an example graph builder grammar being applied to an example web page.

FIG. 10 is a diagram 1000 that illustrates how an outline node and a set of terminal nodes may be generated based on an example graph builder grammar being applied to an example web page 1001. The webpage 1001 includes three text inputs 1005, 1010, and 1015. Currently only text input 1005 includes text content, and text inputs 1010 and 1015 are blank. The shadow graph builder 208 illustrated in FIG. 2 traverses the DOM of the webpage 1001 and identifies the text input 1005. The shadow graph builder 208 may generate the outline node 1030 and terminal nodes 1035, 1040, and 1045 for each of the three text inputs 1005, 1010, and 1015, respectively.

Each of the terminal nodes 1035, 1040, and 1045 are associated with a text editable node of the webpage 1001 and may include text that may be tracked to detect changes to the text content. In the example illustrated in FIG. 10, the terminal node 1035 is associated with the text input 1005. The shadow graph builder 208 or the terminal node itself may be configured to extract the text content from the text input 1005 and to parse the text contents into root content elements. In the example illustrated in FIG. 10, the root content elements represent a sentence, but in other implementations the root content elements may represent a word or phrase, or a larger collection of text such as a paragraph or page of a document. Each root element may be associated with a tile node from a set of tile nodes 1050. In this example, each of the three sentences are associated with a tile node 1055, 1060, and 1065.

Each tile node maintains state information. The state information may include a current representation of the text of the root component element. The state information may also include annotation information associated with the text of the root component element. The state information may also include delta information that represents changes that have been made to the root component element for a least a predetermined period of time, such as since a last set of annotations were requested from the writing intelligence services 150. The state information in the tile node is kept up to date by monitoring events generated by the DOM of the webpage 1001 to detect events that indicate that the contents and/or the structure of the DOM of the webpage 1001 may have been modified. The state information may also maintain a unique identifier of the terminal node with which the tile node is associated. The state information may also include a unique identifier associated with the outline node from which the terminal depends.

Referring again to FIG. 2, the shadow graph 209 is configured to monitor the DOM of the webpage 201 for changes that indicate that the structure and/or contents of the shadow graph 209 may need to be updated to keep the shadow graph 209 synchronized with the webpage 201. The shadow graph 209 may be configured to listen for mutation events generated by the DOM as a result of modifications being made to the structure and/or the contents of the DOM. In some implementations, the outline nodes may be configured to utilize the DOM mutation observer interface to obtain an observer that provides an observer that invokes a specified callback when DOM events occur. The outline node may first invoke the observe method of the mutation observer to specify which portion of the DOM to monitor and which kinds of changes to the DOM to watch for and report.

The DOM mutations to be observed and reported to the node of the shadow graph 209 may include but are not limited to additional to the content of an editable node, deletions of all or part of the contents of the editable node, scrolling or clicking on the contents of an element, style changes to the editable node, and/or other signals indicative of the user interacting with and potentially changing the contents of an element. Other types of events may also be monitored in addition to DOM mutations, such as window events, document events, and other types of events that may be generated by the browser application 130 and/or via the DOM of the webpage 201.

The DOM mutations may also indicate that one or more new editable nodes have been added to the webpage 201. If an editable node is removed and/or new editable node is added, the outline node may remove a terminal node associated with the editable node that has been removed or add a new terminal node associated with the editable node that has been added as described with respect to FIG. 10.

Once the shadow graph 209 has been generated, the shadow graph can be used to provide WAF services to the user. For example, the WAF module 135 can send text content that has recently been or is being created or edited by the user to the writing intelligence services 150. The writing intelligence services 150 may analyze the content and provide annotations (also referred to herein as "critiques") of the text content created or edited by the user. The annotations may include information identifying spelling, grammar, and/or stylistic mistakes in the content being edited by the user and may include one or more suggestions that include alternative language that may be used to address the issue or issues identified by the writing intelligence services 150.

In the example illustrated in FIG. 2, text tile event information 213 is transmitted from the shadow graph 209 to the tile processor 203 in response to an outline node determining that the text content of an editable node has changed. Tiles refer to logical groupings of text that may be sent to the writing intelligence services 150 for processing. Tile information may be stored in tile nodes as discussed with respect to FIG. 10. Additional aspects of optimizing the processing of the tiles will be discussed in greater detail with regard to FIGS. 3 and 4. The text tile event information 213 can include a unique node identifier associated with the terminal node(s) in the shadow graph 209 in which the content may have been added, modified, and/or deleted. The text tile event information 213 may also include the unique identifier of the outline node associated with the terminal node(s). The tile processor 203 may identify the relevant tile nodes based on the identifiers associated with the terminal nodes. The tile processor 203 may aggregate the text content of the tile nodes associated with the terminal node(s) for which the text tile event information 213 has been received. The tile processor 203 may generate an annotation request based on the text content that has been identified as being modified by the user. The annotations are requested for content being worked on by the user in order to provide writing assistance function (WAF) where they may be most useful to the user. For example, the annotations may identify spelling errors or grammar errors in the textual content being edited by the user or may provide stylistic recommendations and/or other recommendations that may be relevant to the user. These changes are monitored indirectly through the shadow graph 209 and the tile nodes, because the WAF module 135 does not have direct control over the content of the webpage 201.

The tile processor 203 may submit the request for annotations to the writing intelligence services 150. The tile processor 203 communicates with the writing intelligence services 150 via a network connection 212, which may be network connection 120. The tile processor 203 can generate annotation events information 214 in response to receiving the annotation information from the writing intelligence services 150. The annotations received from the writing intelligence services 150 may then be reconciled with the tile nodes that represent the current state of the text content on the webpage 201. The annotation events information 214 may be passed to an annotations event dispatcher 215 of the proofing DOM module 202. The event dispatcher 215 may be configured to provide the annotation events information 214 to the outline node, and the shadow graph traversal module 216 may be configured to determine the terminal node(s) associated with the module based on the unique node identifier information included in the annotation events information 214.

In response to the node of the shadow graph 209 receiving the annotation information, reconciliation logic may be executed to ensure that the newly received annotation information are reconciled with any previous annotations. In some implementations, the reconciliation logic may be implemented by critique brokers, such as the critique brokers 308 of FIG. 3 which will be discussed in detail in the examples that follow.

Annotations are received from the writing intelligence services 150 in an unreconciled state. It is possible that the user may have continued typing or otherwise altering the contents of the input where the annotations were to be displayed. In this situation if there were no existing annotations, the annotation information may be discarded, and another request may be made to the writing intelligence services for updated annotation information that reflect the current state of the text input. If there were annotations, the tile node(s) associated with the terminal node of the shadow graph 209 includes state information reflecting those annotations. The reconciliation logic may be configured to attempt to reconcile the annotations with the current state of the text input by comparing the annotation information received with the current state of the text input and the state of the text input at the time that the annotations were requested. The tile nodes may maintain this state information. If the reconciliation service cannot determine whether the annotations are current or out of date, then the annotations may be discarded and a new request to the writing intelligence services 150 maybe be performed to obtain fresh annotation information. Otherwise, if the reconciliation logic can reconcile the annotation information with the current state of the editable node, then the annotations may be displayed to the user via the User Experience Module (UXM) 204.

The UXM 204 may be configured to render various types of highlights on text to indicate that there are annotations associated with that section of the textual content. The highlights may be rendered as an overlay on the webpage 201. Such highlight may include a "squiggly line" underlining a suspected spelling, grammar, or stylistic error in the text, or a callout element comprising a text box with a "tail" that points to a location within the textual content of the editable node to which the annotations apply. Other techniques to draw attention to a section of the text may be used, such as altering the font color and/or the background color of text.

The UXM 204 may be configured to render a list of options for correcting a particular issue with the text. The user may select one of these options to have the UXM 204 automatically replace text in the editable node with alternative text suggested in the annotations. For example, if a spelling, grammar, or stylistic error is suspected, the annotations may include one or more suggested corrections and the user may select one of these corrections to be applied to the textual content of the editable node.

The UXM 204 may be configured to render a context card in response to a user clicking on, hovering a mouse pointer over, or otherwise interacting with a highlighted text element that is associated with an annotation. A context card, as used herein, refers to a user interface element that is overlaid over the at least a portion of the webpage 201 in the browser window. The context card may be used to provide the user with a list of options for correcting an issue with the text or for improving the text. The context card may be informational and may include suggestions regarding how the user may improve the writing of the section of the textual content that has been highlighted.

The user interface logic of the UXM 204 is configured to minimize the number of user interface updates to avoid causing issues with the webpage 201 that would negatively impact the user experience, such as flickering caused by refreshing of user interface elements too frequently and/or slowdown of the browser application. The UXM 204 the critique brokers 308 are configured to only send annotation information to the UXM 204 for rendering when new annotation information is received from the writing intelligence services 150. The UXM 204 may also be configured to re-render existing annotations in response to a style changes on the webpage 201. The UXM 204 may re-render the annotations to match these new attributes.

The UXM 204 may be configured to create a shadow DOM associated with the editable node for which the annotations are to be rendered. A shadow DOM is a separate, encapsulated DOM that is added to an element of the DOM of the webpage 201. The user interface elements to be rendered to represent the annotations may be added to the shadow DOM without interfering with the DOM of the webpage 201. The shadow DOM elements may be rendered by the browser application 130 as if the shadow DOM elements were a part of the DOM of the webpage 201. The attributes of the elements included in the shadow DOM use in rendering the annotations may be configured to have a desired appearance without interfering with the rendering and/or appearance of the other elements of the webpage 201.

The UXM 204 may also be configured to determine the location for the annotations to be rendered over the webpage 201. The annotation information may identify which part of the text an annotation is related but not a specific location on the webpage 201 on which the annotation should be rendered. The annotation information may specify the annotation location in terms of offset and span. The offset and span can be used to determine the starting and end points within the text to which the annotation applies. For example, the offset may indicate that the annotation applies to text beginning at character position X and the span may indicate how many characters Y are included. So, if the character position indicated in the annotations is 7 and the span is 4, then the annotation applies to the characters 7-11 of the text. The UXM 204 may then convert the character location information to geometry on the webpage to determine where to render the annotations.

The UXM 204 may make use of two APIs associated with the DOM of the web page 201 to determine the coordinates where an annotation should be rendered: (1) the range API, and (2) the selection API. The range API provides a method for obtaining the bounding box around a fragment of the webpage 201 based on a specified range. The offset and span information can be used to determine the range, and the bonding box around this range can be used to determine the coordinate for rendering the annotations. The UXM 204 can use the coordinates for adding a DIV tag to the DOM of the webpage 201. The DIV tag defines a division or section of an HTML document that may be used to store other HMTL elements. The graphical elements associated with the annotations may be added to the DIV element for rendering as an overlay to the webpage 201. Another aspect of the DIV tag is that the DIV tag may be used for hit-testing to determine whether a user-controlled cursor, such as a mouse cursor or touch-point for touch screen) intersects with the boundaries of the DIV tag or an element contained therein. The UXM 204 can use this information to determine whether the user has clicked on a section of text associated with an annotation to cause a context card to be displayed with annotation information rendered thereon or to cause the UXM 204 to determine that the user has selected a suggestion from a list of suggestions provided by the writing intelligence services 150 for addressing an issue in the text content.

The selection API may be used to select a range of text and to replace that range of text with alternative text. The range API may be used to select and replace a section of text. For example, the range API may be used to replace a selected range of text with alternate text included in the annotation information provided by the writing intelligence services 150. For example, the writing intelligence services 150 may suggest alternate words or phrases and/or alternate spellings for a word. The UXM 204 may present these to the user as an overlay to the webpage 201 and the user may select one of these options and the UXM 204 may replace the text in the DOM of the webpage with the selected alternate text.

The range and selection APIs may not be available for use with all types of editable nodes. Some types of editable nodes do not support the range and selection APIs. For these types of elements, a shadow element may be created in a shadow DOM and the calculations for rendering on the webpage 201 may be performed on the shadow DOM elements. This approach may require that a timer to be set that triggers polling of contents of the inputs, since some elements have limited APIs available. The range API may be used on the shadow DOM to calculate the bounding box for the annotations, and the annotations may be rendered using a DIV similar to the technique discussed in the preceding example.

Figure 3:
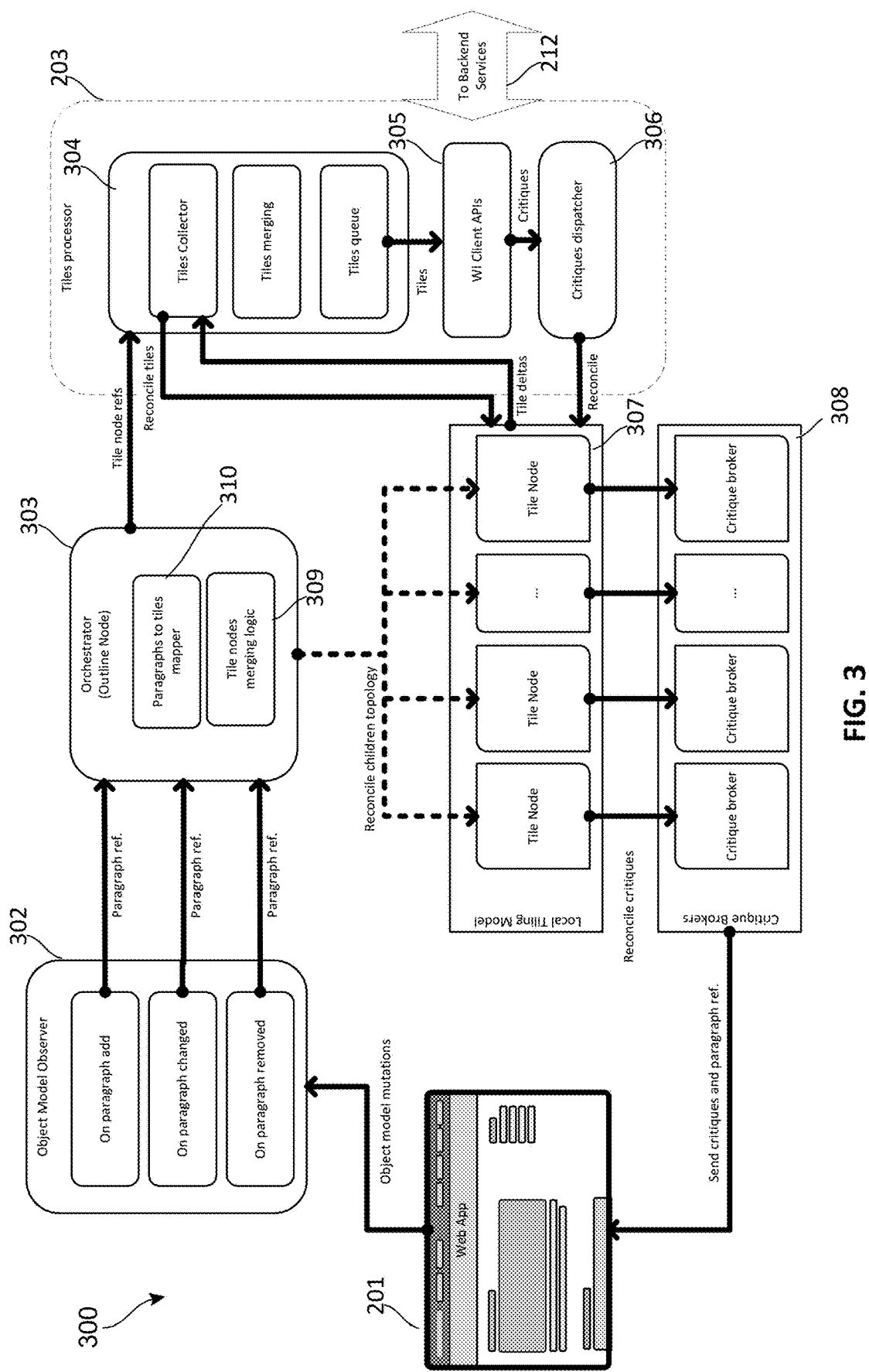
FIG. 3 is a diagram that illustrates additional details related to obtaining annotations for a particular textual element of the webpage and displaying those annotations on the webpage.

FIG. 3 is a diagram 300 that illustrates additional details related to obtaining annotations for a particular textual element of the webpage 201 and displaying those annotations on the webpage 201.

The DOM of the webpage 201 may output model mutations information in response to changes being made to the model which may be detected by the DOM observer 302. The DOM observer 302 may be obtained by an outline node of the shadow graph 209 to monitor a particular portion of the DOM of the webpage 201 for changes in the structure and/or the content of a portion of the DOM of the webpage 201 as described with respect to FIG. 2. In the example illustrated in FIG. 3, the DOM observer 302 is configured to listen for three types of events associated with an editable node included in a portion of the DOM of the webpage 201 being monitored for changes: (1) a paragraph of text being added, (2) a paragraph of text being changed or edited, or (3) a paragraph of text being removed. If any of these three types of events occurs, the DOM observer reports to the outline node 303 the occurrence of the event. The DOM observer may provide a paragraph number or other identifier for the paragraph of text that was added, modified, or deleted. The outline node 303 may implement a paragraphs-to-tiles mapper 310 and a tile node merging logic 309.

In response to receiving the paragraph identifier associated with the paragraph that was added, modified, or deleted, the paragraphs-to-tiles mapper 310 of the outline node 303 may be called to output the identifier of the tile node(s) associated with the paragraphs that were modified. While the example illustrated in FIG. 3 includes a paragraphs-to-tiles mapper 310, other implementations may include mapping by the sentence, by the page, or by another unit of measurement. The tile nodes serve as an intermediary between the shadow graph 209 and the writing intelligence services 150 and maintain state information for a root element of text extracted from an editable node of the webpage 201. As discussed above, the textual content of an editable node associated with a terminal node may be divided into multiple root elements, as illustrated in the example of FIG. 10, and each of those root elements may be associated with a tile node.

A tile node keeps track of changes to the textual content of an editable node of the webpage 201 and facilitates communications with the writing intelligence services 150 to obtain annotations associated with the textual content monitored by the tile node. The tile node processor 203 is configured to determine whether a change to a tile node is significant enough to trigger the sending at least a portion of the updated text to the writing intelligence services 150. Each communication with the writing intelligence services 150 has an associated transport cost and computing cost at the writing intelligence services. Therefore, the tile node processor 203 attempts to balance the need to provide to up to date and relevant annotations with the costs associated with frequent calls to the writing intelligence services. One way the tile node processor 203 may manage resources is to reduce the frequency at which the tile node processor 203 may contact the writing intelligence services 150 to obtain updated annotations from the writing intelligence services. Another way that the tile node processor 203 may manage resources is to limit the payload size (i.e., the amount of text) being sent to the writing intelligence services 150 for analysis. The payload size may be reduced by sending deltas to the writing intelligence services 150 instead of the full text from the tile node(s) being modified. The deltas may represent the changes that were made to the textual content of the editable node since the textual content was last sent to the writing intelligence services 150, which may significantly reduce the amount of data to be send to the writing intelligence services 150.

The tile node merging logic 309 may be configured to merge the textual content of multiple tile nodes together if a modification to the textual content impacts multiple tile nodes. The outline node may keep track of the order of the textual contents of each of the tile nodes relative to each other so that the textual contents may be merged back together for processing by the writing intelligence services 150 in the correct order. For example, the outline node may keep track of an offset and/or span information that indicates where the root element (e.g. the sentence or paragraph) is located in the textual content of the editable node that was modified by the user.

The tile node merging logic 309 may be utilized where the user is editing the contents of the editable node and the edits have or may have impacted multiple root elements. For example, if a user modifies paragraph 2 of a document, the DOM observer 302 may notify the outline node 303 that paragraph 2 is being edited. The paragraphs-to-tiles mapper 310 may access a mapping of the tile nodes that are associated with root elements included in the paragraph that has been modified. The root elements may, for example, be sentences that are included in the paragraph that has been edited. The tile node merging logic 309 may obtain the list of tiles associated in the paragraph from the paragraphs-to-tiles mapper 310 and access these tiles in the tile model module 307.

The tile model module 307 may be configured to store tile nodes associated with the shadow graph 209 and to provide an interface for retrieving the tile nodes stored therein based on the unique node identifier associated with the tile nodes. The terminal nodes of the shadow graph 209 may store the tile node identifier of the tile node associated with that terminal node so that the tile nodes may later be retrieved. Furthermore, each of the tile nodes may store the unique identifier of the terminal node and/or the outline node with which the tile node is associated.

In some implementations, the tile model module 307 may be implemented by the outline node 303. In other implementations, the tile model module 307 may be implemented as a separate module from the outline node 303 as illustrated in FIG. 3.

FIG. 3 shows some additional elements of the tile processor 203 that were not illustrated in FIG. 2 as well as other elements of the WAF 135. The tile processor 203 may include a node poller 304, writing intelligence client APIs 305, and an annotations dispatcher 306. When the outline node 303 determines the identifiers of tile nodes that may be impacted by modifications to the textual content of the editable node associated with the outline node 303, the outline node 303 may provide the tile processor 203 with the unique identifiers of each of the potentially impacted tile nodes. The node poller 304 may include tile collecting logic for retrieving the potentially impacted tile nodes from the tile model module 307 using the unique identifiers of the tile nodes. The node poller 304 may merge the textual content associated with retrieved tile nodes together in a similar manner as the tile node merging logic 309. The node poller 304 may also place the merged textual content from the merged tile nodes into a request for annotations that may be placed in a queue to be transmitted to the writing intelligence services 150 using communications methods provided by the writing intelligence client APIs 305. The API may send requests to the writing intelligence services 150 and receive responses from the writing intelligence services 150 via a network connection 212. The queue may be implemented on a first-in first-out basis, so that the requests that have been waiting in the queue the longest are sent to the writing intelligence services 150 first. The node poller 204 may also include logic for identifying whether a request pending in the queue relates to any tile nodes associated with a new incoming request and may delete the old requests from the queue due to the old requests pending in the queue now being out of date. The annotations request sent to the writing intelligence services 150 may include a delta of the textual content representing changes to the textual content of the tile nodes that has been made since a previous request for those nodes was sent to the writing intelligence services. The use of deltas is optional but may reduce the amount of data that needs to be sent to the writing intelligence services 150.

The node poller 304 may receive a response from the writing intelligence services 150 that includes annotation information (also referred to herein as "critiques" information) that may identify one or more issues with the text sent to the writing intelligence services 150 for analysis. These issues may include spelling errors, grammatical errors, stylistic errors, and/or other issues with the textual content. The annotation information may include one or more proposed solutions for correcting each of the issue noted in the annotation information. The annotation information may also include other suggestions for improving the text. The annotation information may also include information that identifies the location of each issue within the text that was provided to the writing intelligence services 150 for analysis.

The annotations dispatcher 306 of the node poller 304 may be configured to send the annotation information to the tile model module 307 for reconciliation. The tile nodes receive the annotation information provided by the annotations dispatcher 306 and determine whether the annotations apply to the root content elements associated with that tile node. The annotation information returned by the writing intelligence services 150 may include the unique tile node identifiers of the tile nodes associated with the request sent to the writing intelligence services 150. In other implementations, the node poller 304 may keep track of the tile nodes that were included in the request to the writing intelligence service and provide the unique identifiers of those tile nodes to the tile model module 307 with the annotation information received from the writing intelligence services 150.

Each of the tile nodes associated with the annotations may delegate to a critiques broker 308 the reconciliation of the annotation information received from the writing intelligence services 150 with the state variables of the tile nodes. The reconciliation process is used where the textual content of the editable node of the webpage 201 monitored by the outline node 303 has been edited since the request for annotation information was sent to the writing intelligence services 150. The critique brokers may add, remove, change, and/or merge annotations depending upon how the user modified the contents of the editable node. If the textual content associated with the annotation has been removed, then the corresponding annotations may be removed from the annotation information. The critique brokers for multiple tile nodes may also be compared to determine whether an annotation applies to more than one tile node. For example, the writing intelligence services may suggest combining two sentences to clarify the language used by the user. Each of the sentences maybe associated with different tiles, but the same annotation applies to both sentences. The annotations for the two tiles may be merged before being passed to the UXM 204 for rendering and an updated offset and/or span information may be determined for the merged annotations so that the merged annotation is rendered at the correct location. The critique brokers 308 may also change the annotations in response to the text with which the annotations are associated having been moved due to edits to the surrounding text. An updated offset and/or span information may be calculated for such annotations.

The critique brokers 308 may also be responsible for determining which annotation information should be sent to the UXM 204 for rendering over the webpage 201 in the browser application 130. If no updates are required based on the annotation information received, the UXM 204 does not need to be updated. Otherwise, the annotations may be sent to the UXM 204 for rendering as discussed with respect to FIG. 2.

Figure 4:
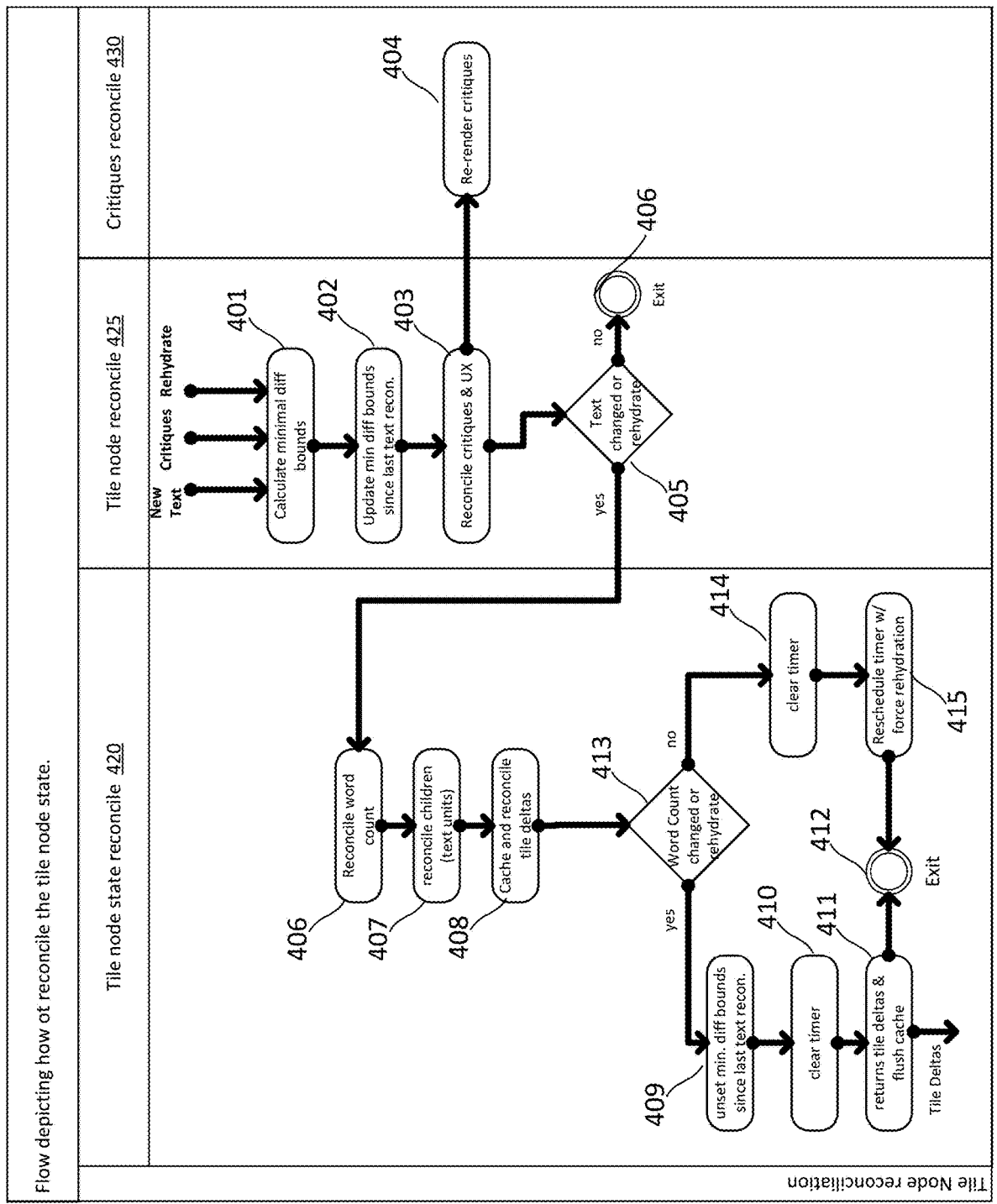
FIG. 4 is a flow diagram of an example process for reconciling new text, annotations, and rendered annotations.

FIG. 4 is a flow diagram of an example process 400 for reconciling new text, annotations, and rendered annotations. The process 400 reconciles the tile node state in response to the user modifying the textual content associated with the tile nodes. As the user modifies the contents of an editable node of the webpage 201 by adding, editing, or deleting textual content, the state of the tile nodes is reconciled with the changes to the textual content of the editable node. The changes to the textual content of the editable node may also impact annotations. The tiles processor 203 may have previously submitted one or more requests to the writing intelligence services 150 for annotations based on one or more previous states of the textual content of the editable node. The reconciliation performed by the process 400 analyzes the changes to the textual content and determines whether these changes impact the annotations. The process 400 may determine whether the modifications to the textual content impacts annotations that have been rendered by the UXM 204. The annotations rendered by the UXM 204 may be reconciled to reflect the modifications to the textual content and any changes to the annotations that may have resulted from these modifications. The process 400 includes three phases in this example implementation to perform the reconciliation operations: a tile node state reconciliation phase 420, a tile node reconciliation phase 425, and a critiques reconciliation phase 430.

In some implementations, the process 400 may be implemented by the critique brokers 308 of FIG. 3. Other elements of the WAF 135 may also be configured to perform the reciliation process. Furthermore, in some implementations, the process 400 may be implemented as a separate module that may provide an API that permits other software modules to call the reconciliation process, such as but not limited to the critique broker 308 and/or another component of the WAF 135. The critique brokers 308 provide a solution to a challenging technical problem reconciling annotations that are received from the writing intelligence services 150 while the user is actively typing on an editable node of the webpage 201 and/or after the user has modified the textual content associated with the editable node. The annotation information is typically received from the writing intelligence services 150 after a short delay. During this time, the user may continue typing and modifying the textual content of the editable node of the webpage 201. As a result, the span and/or offset information associated with the annotations may need to be updated because the relative position of the portion of the textual content associated with the annotations may have changed within the textual element. Furthermore, if the portion of the textual content associated with the annotation has been edited or deleted, the annotations associated with that portion of the textual content are no longer valid and may be discarded.

The techniques disclosed herein provide a technical solution to the technical problem of reconciling user edits and annotations by modeling the topology of the webpage 201 in the shadow graph 209. Textual editable nodes from the webpage 201 may each be mapped to a terminal node of the shadow graph 209 and the textual contents of the editable node may be extracted and stored in one or more tile nodes associated with the terminal node. The textual content is divided up or "chunked" into predetermined content units, such as sentences or paragraphs, which are kept up to date by the shadow graph 209. The tile nodes may be added, deleted, or modified in response to a user modifying the textual content of the editable node of the webpage 201. Thus, the tile nodes may be very volatile and have a short lifespan. To overcome this volatility, the tile nodes are anchored to a terminal node, which is typically a more persistent node that typically has a stable lifespan while the webpage 201 remains active in the browser application 130. The terminal nodes and the outline nodes which may be used to organize multiple terminal nodes provide a stable anchor point that can serve as a reference for annotation requests and responses.

In some implementations, the process 400 may be applied as a standalone process for reconciling changes to text and/or annotations. For example, the process 400 may be implemented by a browser extension or plug-in that provides an API for receiving a textual input and/or annotation inputs associated with the text and for reconciling changes to the text and/or annotations. The process 400 may also be implemented as a standalone application or service that provides an API for receiving textual inputs and annotation inputs, and the standalone application or service may output the reconciled text and/or annotations.

Referring once again to FIG. 4, the process 400 may begin with receiving new text, critique information, and/or a "rehydrate" command. A rehydrate command may be issued periodically to force the state of the tile nodes and the user interface elements rendered by the UXM 204. The rehydrate command may be issued periodically by setting a timer when a reconciliation and refresh are performed, and the rehydrate command is automatically issued upon expiration of the timer. The new text may represent text that the user has typed into an editable node of the webpage 201. The new text may also include textual content that the user has added to or modified. As discussed above, the textual content of the editable node may be chunked into one or more content units, such as but not limited to sentences or paragraphs. A user edit may span more than one chunk of the textual content of the editable node. As a result, the content units associated with more than one tile node may be merged before being submitted to the writing intelligence services 150. The user may continue editing a sentence, paragraph, or other chunk of textual content of the editable node even after the tile processor 203 has submitted a request to the writing intelligence services 150 for annotation information. Meanwhile, the writing intelligence services 150 may provide "critiques" information (also referred to herein as annotation information) in response to a previously submitted request or requests even as the user continues to edit the textual content of the editable node. The process 400 may be used to reconcile differences between the text as it was when the annotations were requested and the text in the current state.

The process 400 may include an operation 401 in which minimum difference bounds are calculated. The minimum difference bounds identify which portions of content unit of a tile node has been changed. Each time that textual content is submitted to the writing intelligence services 150, the current state of the content unit of the tile node or tile nodes associated with the submission may be cached. The submission to the writing intelligence services 150 may include the unique identifiers of the tile nodes associated with the submission, so that the critique information received from the writing intelligence services 150 can be correlated with the respective tile node with which the annotations information is associated. The submissions to the writing intelligence service may also include a timestamp, version number, or other information that may be used to determine which cached version of the tile node contents are associated with the submission. The critique information received from the writing intelligence service may include the unique identifiers tile nodes and/or other information provided to the writing intelligence services 150 with the submissions.

When critique information is received from the writing intelligence services 150, the reconciliation information may be received by the tile processor 203 and provided to the critiques brokers 308 for processing. Each of the tiles associated with content may be identified by matching the unique identifiers for the tile nodes included in the critiques information with the unique identifiers The tile model module 307 may perform this matching and provide the critiques information and the tile node information to the critiques brokers 308 for processing. Each tile node may have its own instances of a critiques broker, which may perform the operations of the process 400 for reconciliation described herein.

Figure 11:
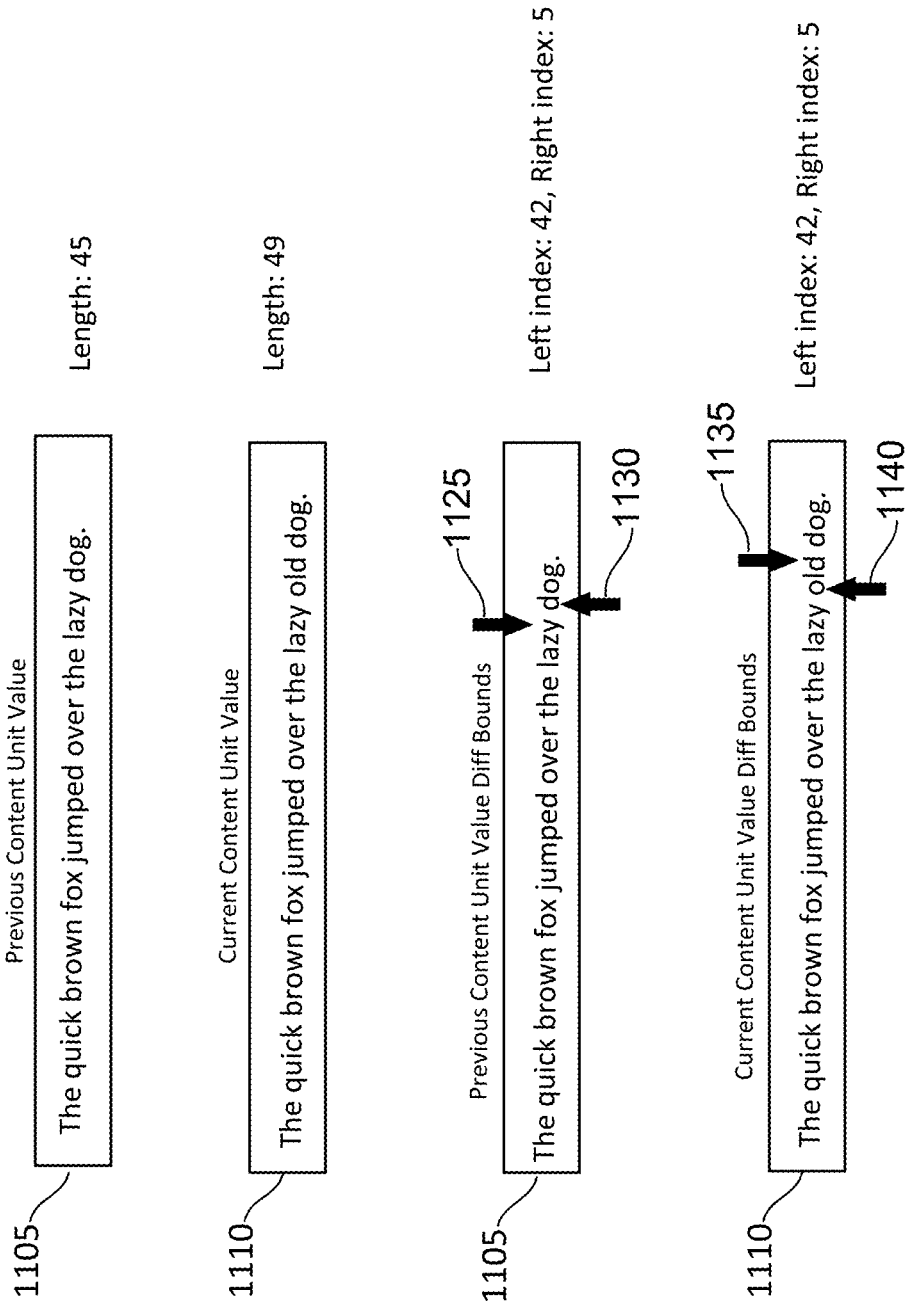
FIG. 11 is a diagram that illustrates an example process for determining the minimum difference boundaries for a current and previous textual content strings.
Figure 12:
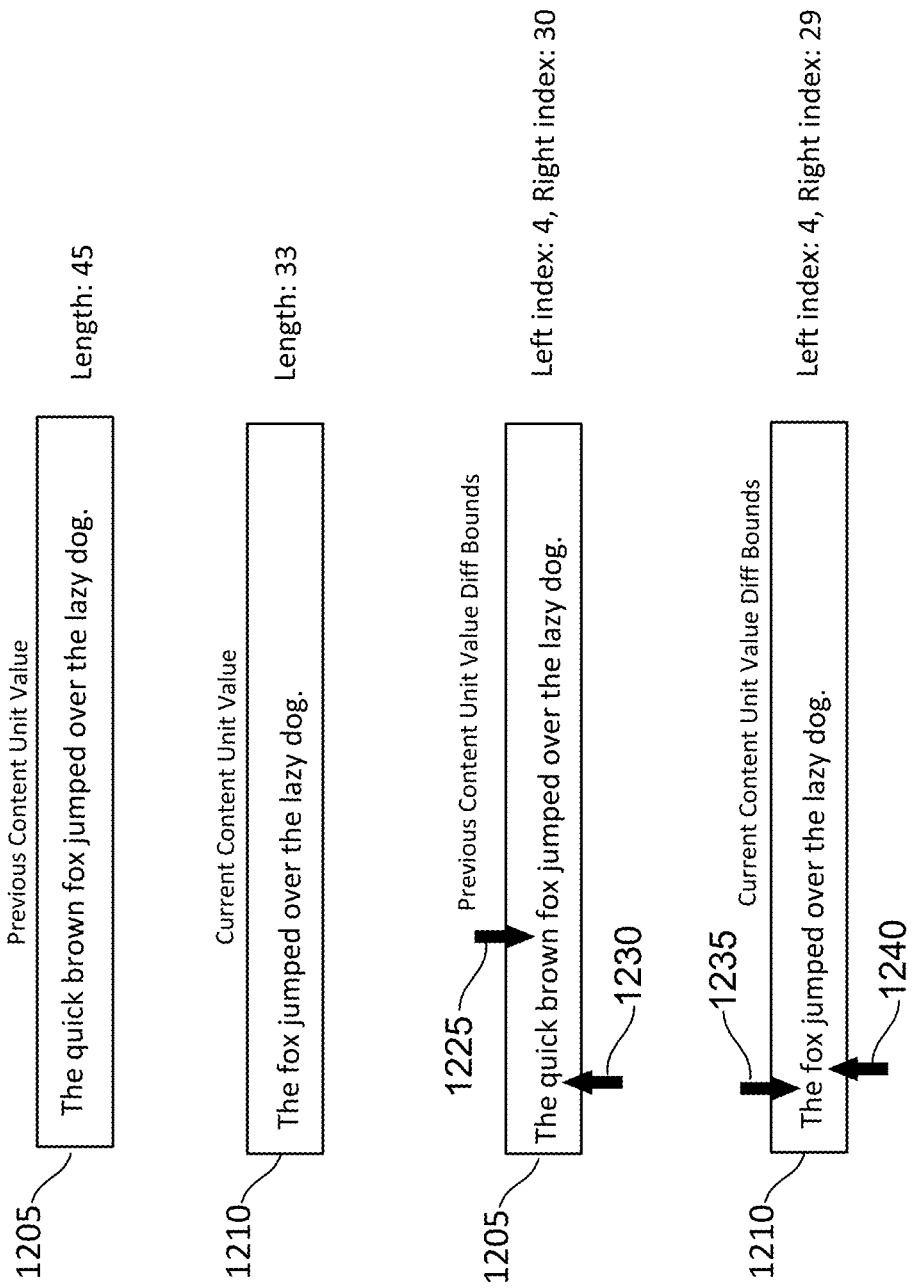
FIG. 12 is a diagram that illustrates an example process for determining the minimum difference boundaries for a current and previous textual content strings.
Figure 13:
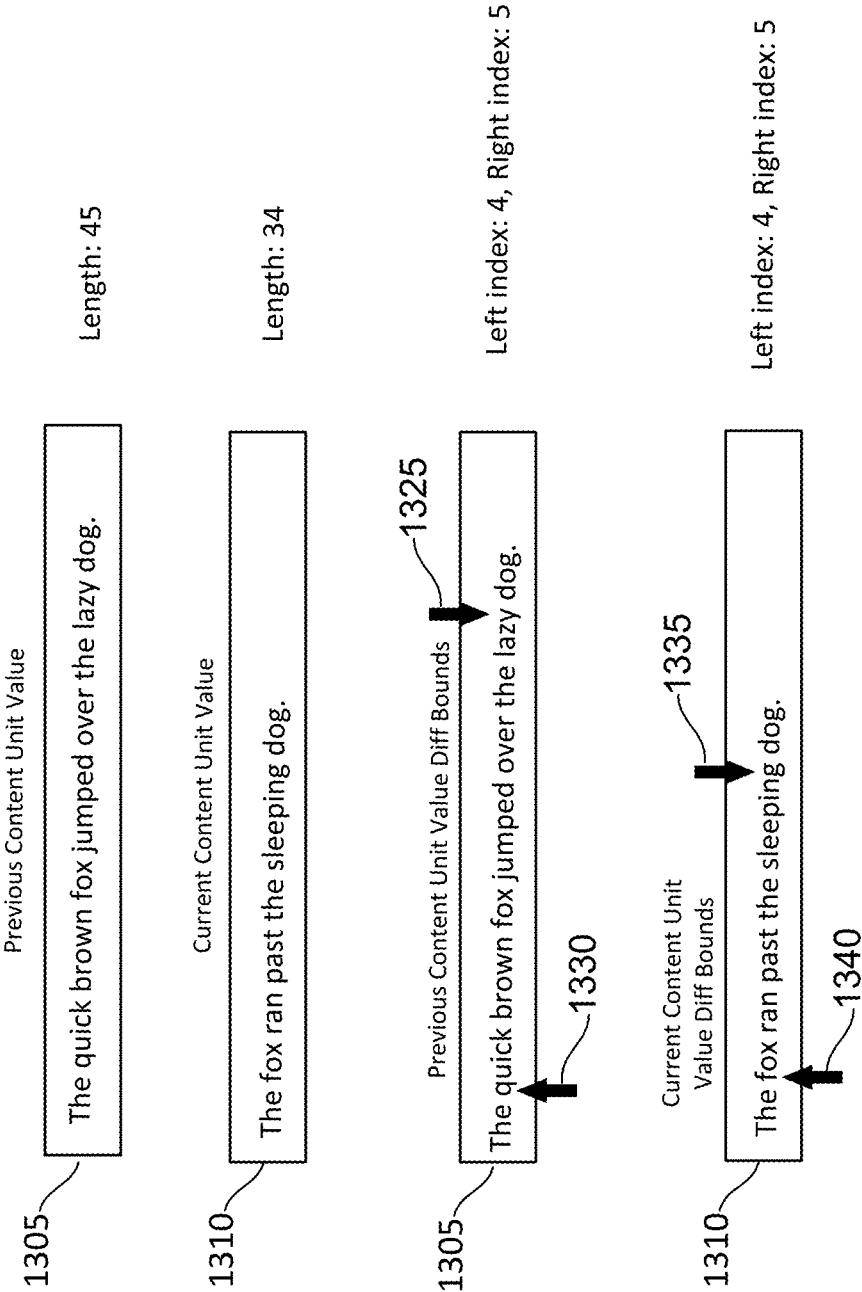
FIG. 13 is a diagram that illustrates an example process for determining the minimum difference boundaries for a current and previous textual content strings.

Once the tile nodes have been identified, the minimum difference bounds may be calculated to determine whether there were any changes made to the content unit associated with each tile node between the time that the submission to the writing intelligence services 150 was made and the time that the critiques information was received from the writing intelligence services 150. The text of the content unit associated with the tile node at the time that the submission was made is referred to as a "previous content unit value" string and the text of the content unit associated with the tile node at the time that the critiques information is received is referred to as a "current content unit value" string for the tile node. If no changes were made to content unit between the time that request for critiques information was submitted and the time that the critiques information was received, then the previous content unit value string will be identical to the current content unit value string. If modifications were made to the text of the content unit, the two strings will differ. The minimum differences bounds calculation identifies the portion of the two strings that differ, which can be used to determine whether the critiques information received from the writing intelligence service 150 is still valid. The minimum difference bounds may be calculated by comparing the previous value string with the current content value string from left to right until a first difference is determined a first location and by comparing the previous value string with the current value string from right to left until a second difference is determined at a second location. FIGS. 11-13 illustrate examples in which the minimum difference bounds are calculated for a previous content unit value string and a current content unit value string.

FIG. 11 show an example in which minimum difference bounds are calculated for an example previous content unit value string 1105 and a current content unit value string 1110. The text of the previous content unit value string 1105 is the sentence: "The quick brown fox jumped over the lazy dog." In this example, the sentence is edited to produce the current content unit value string 1110: "The quick brown fox jumped over the lazy old dog." The two strings are compared character by character from left to right and then are compared character by character from right to left until a difference between the two strings is detected in each direction. If no difference is detected between the two strings, then the two strings are identical, and no modifications were made to the content unit associated with the tile node.

The left marker 1130 is positioned at the 43rd character from the left (index: 42) of the previous content unit value string 1105. The left marker 1130 indicates the first difference between the previous content unit value string 1105 and the current content unit value string 1110 when comparing the previous content unit value string 1105 and the current content unit value string 1110 from left to right. The right marker 1125 is positioned at the 6th character from the right (index: 5). The right marker 1125 indicates the first difference between the previous content unit value string 1105 and the current content unit string value 1110 when comparing the previous content unit value string 1105 and the current unit value string 1110 from right to left.

The left marker 1140 is positioned at the 43rd character from the left (index: 42) of the current content unit value string 1110. The left marker 1140 indicates the first difference in the current content unit value string 1110 when comparing the previous content unit value string 1105 and the current content unit value string 1110 from left to right. The right marker 1135 is positioned at the 6th character from the right (index: 5). The right marker 1135 indicates the first difference in the current content unit value string 1110 when comparing the previous content unit value string 1105 and the current unit value string 1110 from right to left.

The length of the previous content unit value string 1105 is 45 characters, and the length of the current content unit value string 1110 is 49 characters. In the example illustrated in FIG. 11, the previous content unit value string 1105 is shorter than the current content unit value string 1110, which indicates that the text of the content unit has been modified and a least some text has been added to the content unit.

The left and right difference bounds for the current content unit value string 1110 can be used to calculate a span of the text that was added to the previous content unit value string 1105. The span may be represented by a start character position, such as the index of the left marker 1140 in current content unit value string 1110, and/or an end character position, such as the index of the right marker 1135 in current content unit value string 1110, and/or an offset value from either the start or end character position, where the offset is an integer value representing a number of characters from either the start or end position. In the example illustrated in FIG. 11, the offset may be 2 since the newly added text comprises three characters. The end of the string is offset from the beginning of the string by two characters not counting the character at the beginning of the string and the beginning of the string is offset by two characters from the end of the string not counting the end character. The span and offset information determined for the previous content unit value string 1105 and the current content unit value string 1110 may be used in later operations of the process 400 to reconcile annotations and for reconciling tile node contents.

FIG. 12 shows an example in which minimum difference bounds are calculated for an example previous content unit value string 1205 and a current content unit value string 1210. The text of the previous content unit value string 1205 is the sentence: "The quick brown fox jumped over the lazy dog." In this example, the sentence is edited produce the current content unit value string 1210: "The fox jumped over the lazy dog." As in the preceding example, the two strings are compared character by character from left to right and then are compared character by character from right to left until a difference between the two strings is detected in each direction.

The left marker 1230 is positioned at the 5th character from the left (index: 4) of the previous content unit value string 1205. The left marker 1230 indicates the first difference between the previous content unit value string 1205 and the current content unit value string 1210 when comparing the previous content unit value string 1205 and the current content unit value string 1210 from left to right. The right marker 1225 is positioned at the 31st character from the right (index: 30). The right marker 1225 indicates the first difference between the previous content unit value string 1205 and the current unit value string 1210 when comparing the previous content unit value string 1205 and the current unit value string 1210 from right to left.

The left marker 1240 is positioned at the 5th character from the left (index: 4) of the current content unit value string 1210. The left marker 1240 indicates the first difference between the current content unit value string 1210 and the previous content unit value string 1205 when comparing the previous content unit value string 1205 and the current content unit value string 1210 from left to right. The right marker 1235 is positioned at the 30th character from the right (index: 29). The right marker 1235 indicates the first difference between the current content unit value string 1210 and the previous content unit value string 1205 when comparing the previous content unit value string 1205 and the current unit value string 1210 from right to left.

The length of the previous content unit value string 1205 is 45 characters, and the length of the current content unit value string 1210 is 33 characters. In the example illustrated in FIG. 12, the previous content unit value string 1205 is longer than the current content unit value string 1210, which indicates that the text of the content unit has been modified and a least some text has been deleted from the content unit.

The left and right difference bounds for the previous content unit value string 1205 can be used to calculate a span of the text that was deleted from the previous content unit value string 1205. The span may be represented by a start character position, such as the index of the left marker 1230 in previous content unit value string 1205, and/or an end character position, such as the index of the right marker 1225 in previous content unit value string 1205, and/or an offset value from either the start or end character position, where the offset is an integer value representing a number of characters from either the start or end position. In the example illustrated in FIG. 12, the offset may be 10 since the newly added text comprises eleven characters (including spaces). The end of the string is offset from the beginning of the string by 10 characters not counting the character at the beginning of the string and the beginning of the string is offset by 10 characters from the end of the string not counting the end character.

FIG. 13 shows an example in which minimum difference bounds are calculated for an example previous content unit value string 1305 and a current content unit value string 1310. The text of the previous content unit value string 1305 is the sentence: "The quick brown fox jumped over the lazy dog." In this example, the sentence is edited produce the current content unit value string 1310: "The fox ran past the sleeping dog." As in the preceding example, the two strings are compared character by character from left to right and then are compared character by character from right to left until a difference between the two strings is detected in each direction.

The left marker 1330 is positioned at the 5th character from the left (index: 4) of the previous content unit value string 1305. The left marker 1330 indicates the first difference between the previous content unit value string 1305 and the current content unit value string 1310 when comparing the previous content unit value string 1305 and the current content unit value string 1310 from left to right. The right marker 1325 is positioned at the 6th character from the right (index: 5). The right marker 1325 indicates the first difference between the previous content unit value string 1305 and the current unit value string 1310 when comparing the previous content unit value string 1305 and the current unit value string 1310 from right to left.

The left marker 1340 is positioned at the 5th character from the left (index: 4) of the current content unit value string 1310. The left marker 1340 indicates the first difference between the current content unit value string 1310 and the previous content unit value string 1305 when comparing the previous content unit value string 1305 and the current content unit value string 1310 from left to right. The right marker 1335 is positioned at the 6th character from the right (index: 5). The right marker 1335 indicates the first difference between the current content unit value string 1310 and the previous content unit value string 1305 when comparing the previous content unit value string 1305 and the current unit value string 1310 from right to left.

The length of the previous content unit value string 1305 is 45 characters, and the length of the current content unit value string 1310 is 34 characters. In the example illustrated in FIG. 13, the previous content unit value string 1305 is longer than the current content unit value string 1310, which indicates that the text of the content unit has been modified and a least some text has been deleted from the content unit.

The left and right difference bounds for the previous content unit value string 1305 can be used to calculate a span of the text that was deleted from the previous content unit value string 1305. The span may be represented by a start character position, such as the index of the left marker 1330 in previous content unit value string 1305, and/or an end character position, such as the index of the right marker 1325 in previous content unit value string 1305, and/or an offset value from either the start or end character position, where the offset is an integer value representing a number of characters from either the start or end position. In the example illustrated in FIG. 13, the offset may be 10 since the newly added text comprises eleven characters (including spaces). The end of the string is offset from the beginning of the string by 10 characters not counting the character at the beginning of the string and the beginning of the string is offset by 10 characters from the end of the string not counting the end character. The minimum difference bounds calculated in the preceding steps may be used to determine what text was added, edited, or removed.

The process 400 may include an operation 402 in which the minimum difference bounds since the last text recommendation was received are updated. The tile node may store the minimum difference bounds information that was previously calculated in response to receiving critiques information from the writing intelligence services 150. The previously stored value may be replaced with the values determined in operation 401.

The process 400 may include an operation 403 in which the critiques information received from the writing intelligence services 150 may be reconciled with the user interface rendered by the UXM 204. As discussed in the preceding examples, the critiques information received from the writing intelligence services 150 may include offset and/or span information associated with the location of the annotations within the textual content of the editable node of the webpage 201. However, this span and/or offset information may be out of date if the user has altered a portion of the textual input.

In operation 403, a determination may be made whether a change to the textual content associated with the content unit has changed, and if such a change has occurred, whether any of the annotations associated with the content unit are impacted by this change. The offset and/or span information associated with the annotations for the tile node being reconciled may be compared with the offset and/or span information associated with the minimum difference bounds information determined in operation 401. Any annotations that fall within the portion of the textual content that was altered by adding, modifying, or deleting textual content are identified in operation 403 based on the offset and span information associated with each of the annotations. Some annotations may apply to the entire content unit, and such annotations may be identified in operation 403. For example, the annotation may be a stylistic suggestion that applies to an entire sentence. If even part of that sentence is modified, the annotation may no longer valid. Other annotations, such as a spelling suggestion or an alternate word suggestion, may apply to a single word of the textual content of the content unit. Such annotations are likely to still be valid even if another portion of the textual content associated with the content unit is modified. The location of the textual content associated with such annotations may be change based on the modifications that were made to the textual content. The locations of such annotations may be recalculated based on the span and offset information determined in operation 401. For example, if the content unit modified is a sentence, and the text is added or deleted from the middle of the sentence, a word included in an unmodified end portion of the sentence may no longer be located at the same offset from the beginning or end of the textual content. A new offset for the word may be determined by searching for that word in the Referring back to FIG. 12 to illustrate this concept, suppose for this example that the word "lazy" had an annotation associated with which includes two alternate word suggestions: "inattentive" and "lackadaisical." The UXM 204 may render an indication proximate to the word "lazy" that indicates that the alterative word suggestions are available. The portions of the textual content that have not been modified may be searched for the word "lazy" to identify the new offset of the word within the modified textual content of the content unit. In other implementations, differences in the length of the previous content unit value string and the current content unit value string may be used to determine the new offset of the word. New offsets may be determined for each word or other subset of text was associated with annotations before the modifications were made to the textual content. Relocation information may be determined for each of the annotations for which the offset information has changed. The relocation information may include a new offset where the beginning or end of the word or other subset of text is located.

The process 400 may include an operation 404 in which the UXM 204 may re-render the annotations being displayed by the UXM 204 as overlays to the webpage 201 based on the new offset and/or span information calculated in operation 403. If the annotations were not previously rendered, then the UXM 204 may render them based on the new offset and/or span information. If annotations associated with the previous content unit value string were rendered by the UXM 204, the UXM 204 may be configured to discard the annotations if any changes to the textual content associated with the content unit was determined in operation 403. In other implementations, the UXM 204 may re-render the annotations based on the relocation information determined in operation 403. The relocation information may include new offset and span information for annotations that were determined to be part of the textual content that was not modified. The new offset and span information can be used to re-render the annotations so that the annotations align properly with the respective portions of the content associated with the respective annotations. Annotations that were associated with the portion of the textual content that were added, modified, and/or deleted as indicated by the minimum bounds information may be discarded. The UXM 204 may re-render the annotations if any of the annotations are to be discarded that fall within the portion of the portion of the textual content that were added, modified, and/or deleted.

The process 400 may continue with an operation 405 in which a determination is been made whether the text has been modified by the user or a rehydrate command has been received. The determination whether the text has been made may be based on the whether the previous content unit value string and the current content unit value string differ. If the text has not been modified and no rehydrate command was received, then the process may proceed to operation 406 where the process 400 terminates.

Otherwise, the process 400 may continue with operation 406 in which the word count between the previous version and the current versions of the textual content associated with tile may be reconciled. The tile node may store a word count for the textual content associated with that tile node. In some implementations, a word count may be determined by counting the words within the current content unit string value. In other implementations, a word count associated with the portion of the textual content that changed may be determined based on the offset and/or span information determined in operation 401. The number of words that were added and/or deleted may be determined by performing a word count on the portion of the textual content to which text was added, modified, and/or from which textual content was deleted. The tile node may store the previous word count, and the stored value may be adjusted based on the number of words that were added and/or deleted. In some implementations, other counts may be maintained in addition to or instead of a word count, such as but not limited to a character count for the a total number of characters of text include in the textual content associated with the tile node, a number of sentences associated with the textual content, a number of paragraphs associated with the textual content, and/or other information regarding the textual content associated with the tile node.

The process 400 may also continue with operation 407 in which child text units are reconciled. In operation 407, the text that is currently associated with the tile node may be reassessed to determine whether the new text now includes more than one predetermined content unit. For example, if the user has added a new sentence of text, the tile node may represent two sentences rather than the originally intended single sentence. In some implementations, the tile processor 203 may split the tile node into two separate tile nodes, with one sentence being associated with each tile node. In other implementations, the tile node may retain more than predetermined content unit, but this may lead to inefficiencies in the processing of annotation requests and responses as the size of the textual content associated with the tile node increases.

The process 400 may continue with operation 408 in which tile deltas are reconciled and cached. The tile processor 203 may update the tile model module 307 with the changes to the tile node information. As discussed in the preceding examples, the tile node information associated with a file may include tile deltas which identify changes to the textual content associated with tile over a period of time, such as since a last set of annotations were requested from the writing intelligence services 150. The tile deltas can also be provided to the writing intelligence services 150 when requesting updated annotations. Sending the tile deltas rather than the entirety of the textual content associated with the tile node may reduce network the amount of data that is sent to the writing intelligence services 150. The writing intelligence services 150 may maintain information for indicating what the previous value of the textual content at the time a previous request for content was made and may be configured to determine a current state of the textual content based on the deltas provided to the writing intelligence service 150. The usage of deltas is optional. In some implementations, the entire textual content is transmitted each time a chance occurs.

The process 400 may continue with operation 413 in which a determination is made whether the word count of the text associated with the tile node has changed or the rehydrate command has been issued. Operation 413 may be included to prevent a request for critiques from being sent to the writing intelligence services 150 every time an insignificant change is made to the textual content. In the example implementation of FIG. 4, operation 413 is checks to see if at least the word count has changed before sending a request to the writing intelligence services 150. In other implementations, a different threshold value to be satisfied may be selected. For example, operation 413 may be configured to determine whether a sentence count associated with the tile node has changed before sending a request to the writing intelligence services 150. The type of threshold associated with operation 413 may depend, at least in part, on the type of annotation being requested from the writing intelligence services 150. For example, for spelling checks, checking to see whether a word count has incremented may be a sufficient threshold for determining that the textual content has changed sufficiently to send a request to the writing intelligence services 150. Spelling checks typically do not require much contextual information regarding multiple words used together so triggering a request for spell checking on a word by word basis should provide acceptable results. In another example, a grammar check may have a multi-word threshold of two or more words, because a grammar check may check whether a particular word is used correctly in context with one or more other words. For example, a grammar check may verify verb tense as one of the checks performed on the textual content, and such a check may require multiple words of the textual content in order to determine whether the correct verb tense has been used in context. In yet another example, a stylistic check may be performed to on the textual content to provide stylistic suggestions for improving the writing style of the textual content. Such checks may require more context to identify stylistic issue and may operate on a sentence by sentence basis. Each of these examples are intended to illustrate that the threshold for sending a request to the writing intelligence services 150 may vary based on the particular implementation and the process 400 is not limited to these specific examples. Furthermore, the process 400 may be configured to utilize different thresholds for different types of critiques requests.

The process 400 may utilize a couple of optimizations when chunking textual content into sentences. One optimization is to analyze the textual content to identify a plurality of predetermined edge cases that may exist in the textual content that may incorrect sentence boundary determinations and replacing those elements with a placeholder string before analyzing the textual content for sentence boundaries. For example, the use of the abbreviation "e.g." in a sentence may be temporarily replaced by a placeholder string while the textual content is being chunked into sentences. Once the text has been chunked, the placeholder may be replaced with the original text. This approach may significantly reduce the complexity of chunking algorithm for chunking the text into sentences due to problematic edge cases being identified and replaced with a placeholder before the chunking is performed. Another optimization that may be used to optimize chunking of textual content is incremental chunking. Once the text has been initially chunked into sentences, the portions of the textual content that are identified as different based on the minimum difference boundaries may be analyzed to determine whether another sentence boundary has appeared in the portion of the text that was added or modified. Furthermore, a sentence boundary may have fallen into a section of textual content that was deleted. Checking only the difference portion of the textual content using such an incremental approach may provide a rapid and efficient approach that does not require all of the textual content to be reanalyzed each time that the text changes. These optimizations may also be utilized by to other components of the systems disclosed herein to optimize the chunking of text.

If either of the word count condition (or other similar condition in other implementations) is satisfied or a rehydrate command has been received in operation 413, the process 400 may continue to operation 409. Otherwise, the operation may continue with operation 414. In operation 414, a timer associated with the rehydration command is cleared, and in operation 415, the timer associated with the rehydration command is reset to cause the process 400 to performed automatically upon expiration of the timer. Upon expiration of the timer, a rehydration command may be issued to cause the tile processor 203 initiate process 400. The rehydration command may be scheduled to periodically force the reconciliation of the tile nodes and to update the annotations and/or other user interface elements rendered by the UXM 204.

The process 400 may, in operation 409, unset or clear the minimum difference bounds since the last text recommendation was received. The timer associated with the rehydration command may also be reset in operation 410. In operation 411, a set of tile deltas may be returned that identify changes that were made to the tile node and the cache used by the tile processor 403 and/or other components may be cleared. The tile deltas reflect changes that were made to one or more tiles based resulting from new text and/or critiques having been received. The tile deltas can be provided to the node poller 304, which is responsible for preparing tile node information to be sent to the writing intelligence services 150 to obtain new critiques information. The writing intelligence services 150 may provide various types of critiques, such as but limited to spelling, grammar, style, and/or other aspects of the writing that may be improved or corrected. The process may then terminate at operation 412. However, the process may be triggered once again in response to new text, annotations, and/or a rehydrate command being received.

Figure 5:
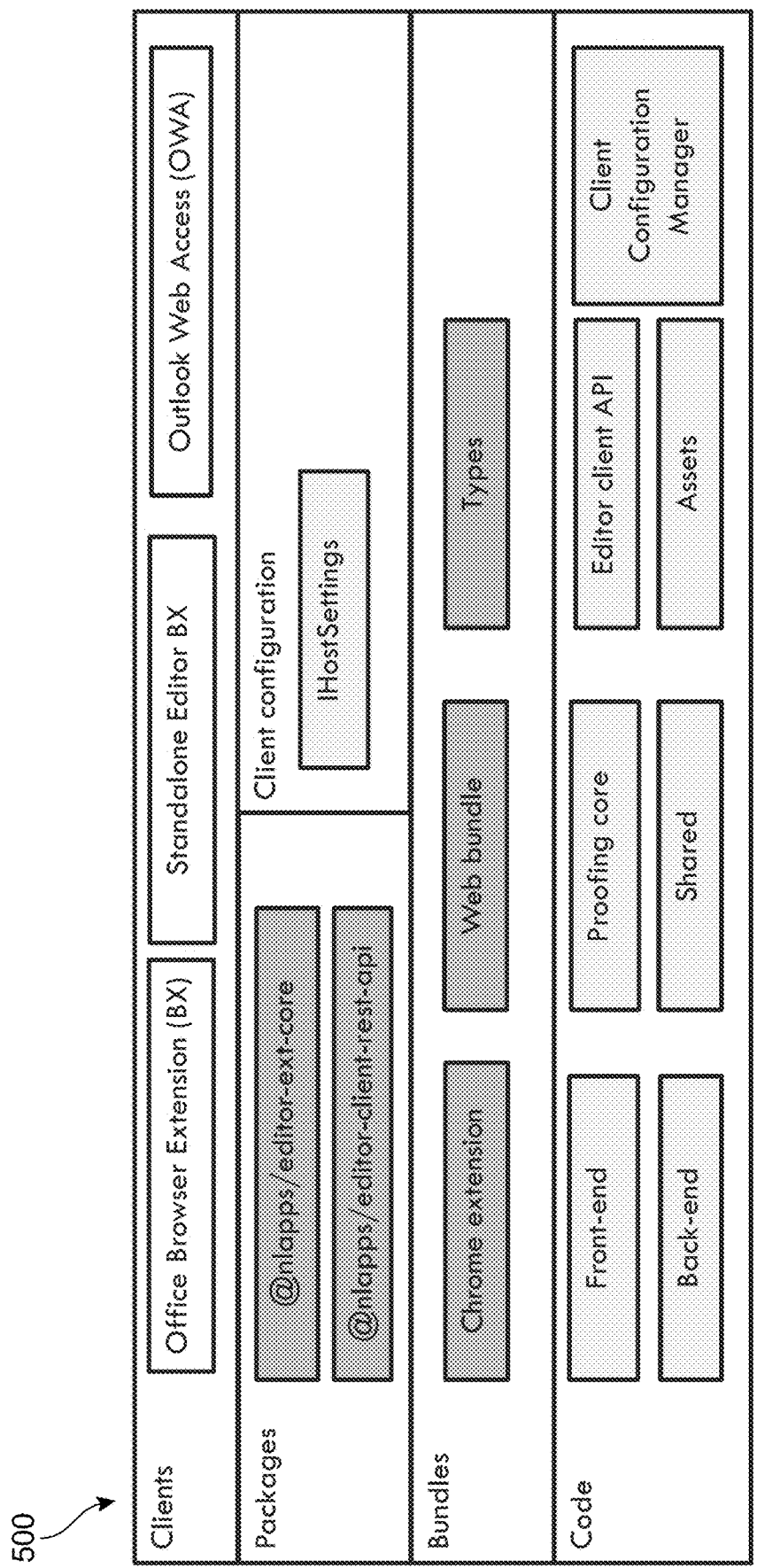
FIG. 5 is a diagram illustrating an example of the code distribution mechanism that may be used to implement the WAF module of FIG. 1.

FIG. 5 is a diagram 500 illustrating an example of the code distribution mechanism that may be used to implement the WAF module 135. The WAF module 135 may be implemented in modular, reusable, and extensible manner. The example illustrated in FIG. 5 indicates that the WAF module 135 may be implemented to operate with various types of clients. For example, the WAF module 135 may be implemented as a Microsoft Office Browser Extension, a browser extension for a standalone editor such as a web browser, and/or an Outlook Web Access (OWA) extension module. The WAF module 135 features reusable and customized code that may extended or modified provide additional functionality to the WAF module 135. Furthermore, the WAF 135 may utilized shared packages and bundles. The same codebase may be reused and natively integrated into various software products for improved performance and responsiveness.

Figure 6:
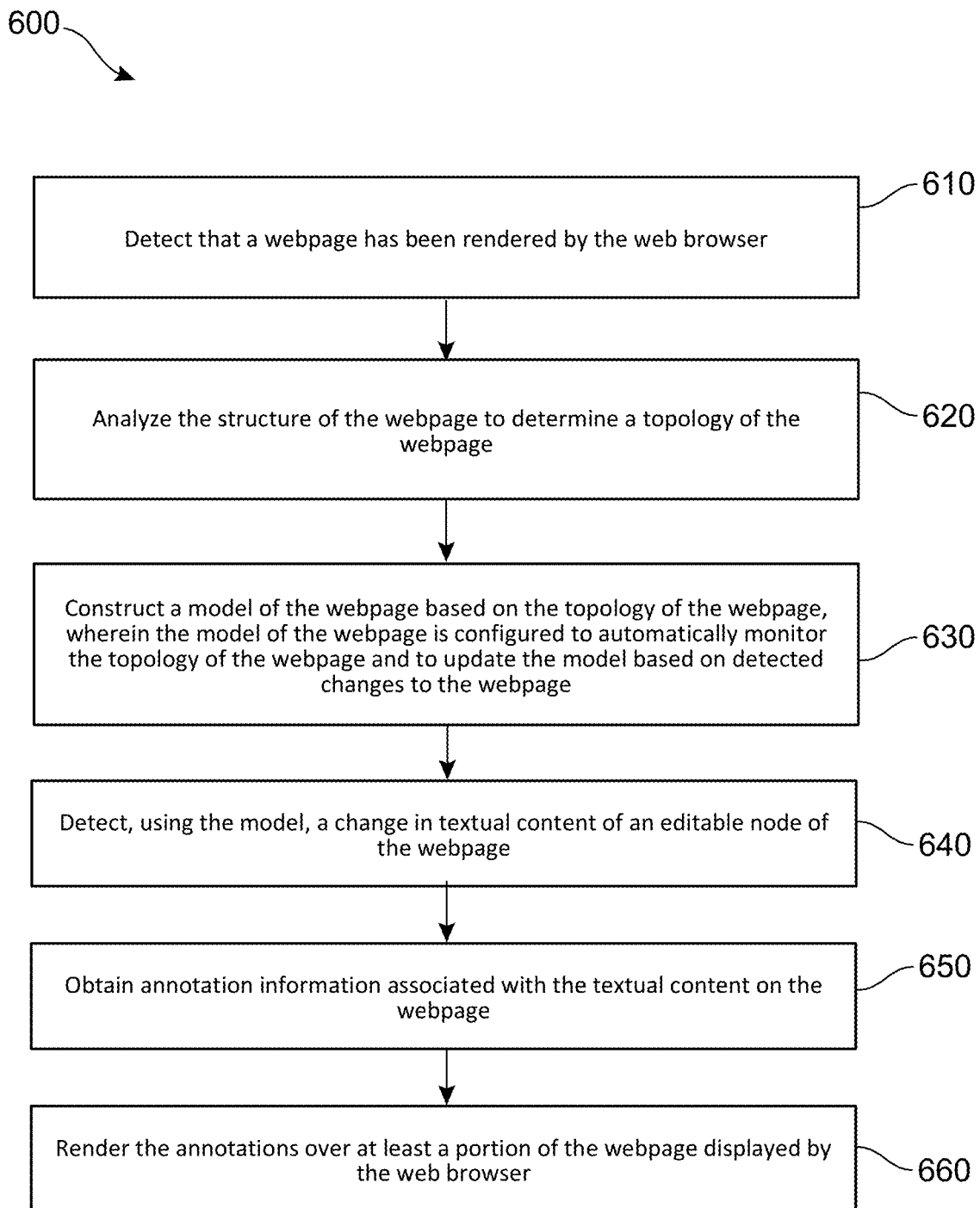
FIG. 6 is a flow diagram of an example process for providing writing assistance features on a web page according to the present disclosure.

FIG. 6 is a flow diagram of an example process 600 for providing writing assistance features on a web page according to the present disclosure. The process 600 may be implemented by the WAF module 135 to provide WAF services on a webpage 201 rendered by the browser application 130.

The process 600 may include an operation 610 of detecting that the webpage has been rendered by the web browser. The WAF module 135 may be configured to listen for various events, such as a change in the URL of the webpage 201 being accessed by the browser, as discussed above with respect to FIG. 2, as an indication that the browser application 130 has rendered the webpage 201.

The process 600 may include an operation 620 of analyzing the structure of the webpage to determine a topology of the webpage. As discussed above with respect to FIG. 2, the topology of the webpage 201 may be determined by traversing the tree-like structure of the DOM of the webpage 201.

The process 600 may include an operation 630 of construct a model of the webpage based on the topology of the webpage. The model of the webpage is configured to automatically monitor the topology of the webpage and to update the model based on detected changes to the webpage. As discussed above with respect to FIG. 2, the topology of the webpage 201 may be analyzed by one or more grammars to generate a shadow graph 209 that provides for automatically updating model of the webpage 201.

The process 600 may include the operation 640 of detecting, using the model, a change in textual content of an editable node of the webpage. As discussed with respect to FIGS. 2 and 3, the outline nodes to the shadow graph 209 may be configured to listen for events that are indicative of the textual content of an editable node of the webpage 201 having modified.

The process 600 may include the operation 650 of obtaining annotation information associated with the textual content on the webpage 201. The outline node may trigger the tile processor 203 to process the textual content of the tile nodes that are associated with textual content that may have changed, and to submit a request for annotations from the writing intelligence services 150.

The process 600 may include the operation 660 of rendering the annotations over at least a portion of the webpage displayed by the web browser. As discussed in the preceding examples, the critique brokers 308 may be configured to determine whether the user interface needs to be updated to reflect the annotations obtained from the writing intelligence services 150. The UXM 204 may be provided with the annotations that are to be displayed and the UXM 204 may be configured to render the annotations as an overlay to the contents of the webpage 201 according to the techniques discussed with respect to FIG. 2.

Figure 7:
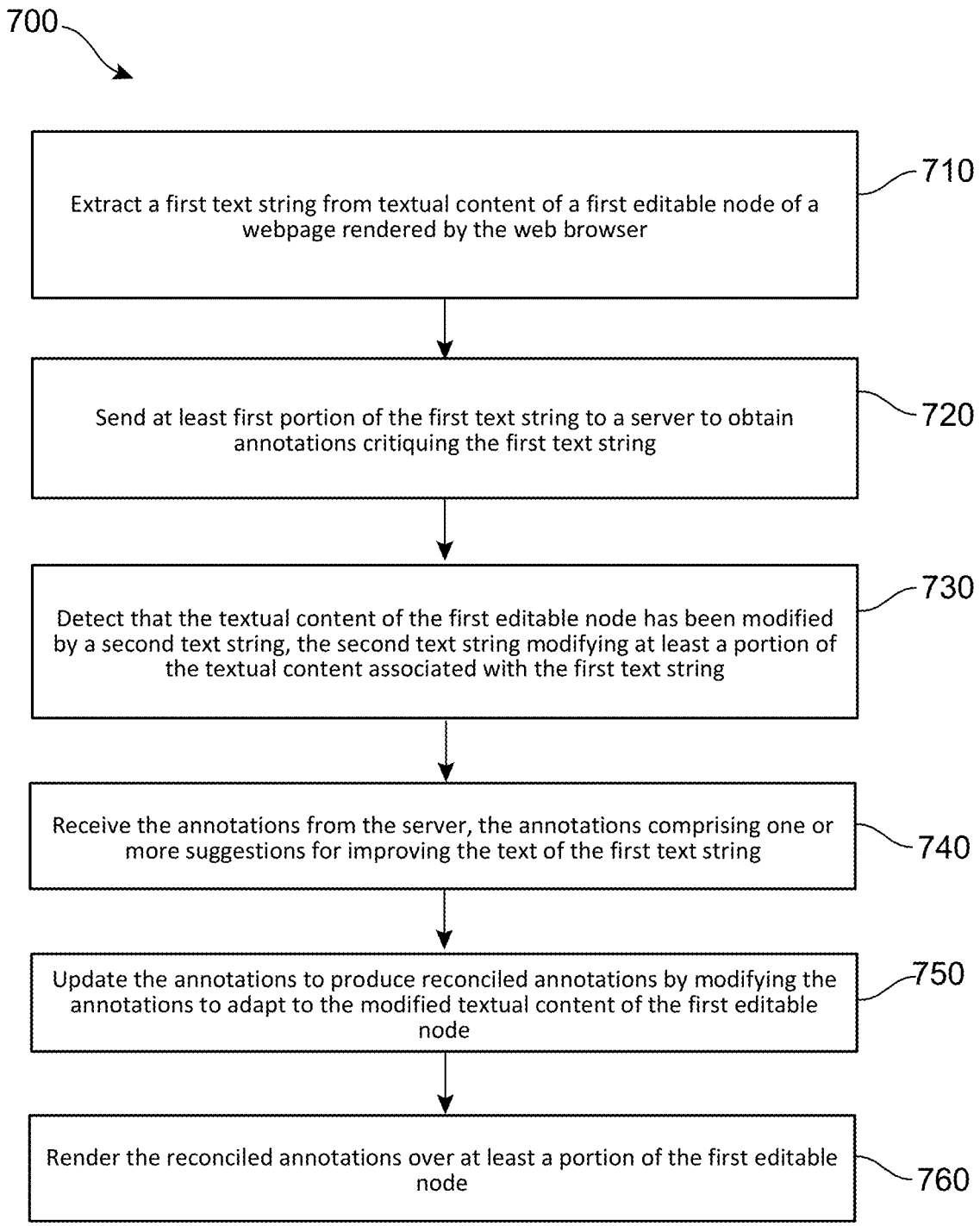
FIG. 7 is a flow diagram of an example process for reconciling annotations for a web page according to the present disclosure.

FIG. 7 is a flow diagram of an example process 700 for providing annotations for a web page according to the present disclosure. The process 700 may be implemented by the WAF module 135 to provide WAF services on a webpage 201 rendered by the browser application 130.

The process 700 may include an operation 710 of extracting a first text string from textual content of a first editable node of a webpage rendered by the web browser. As discussed in the preceding examples, a web page 201 may be modeled by generating a shadow graph 209 that represents the topography and contents of the webpage 201. The contents of any of the editable nodes included in the model may be extracted from the model for analysis. The shadow graph 209 is configured to automatically monitor for mutations events indicative of changes in the DOM of the webpage and to automatically update the contents of the model based on the detected changes.

The process 700 may include an operation 720 of sending at least first portion of the first text string to a server to obtain annotations critiquing the first text string. As discussed in the preceding example implementations, a request may be sent to the writing intelligence services 150 to have the writing intelligence services 150 analyze a text string and to provide critique information on the text string. The critique information may include information that may be used to improve the writing included in the text string. The suggestions may be related spelling, grammar, style, and/or other aspects of the writing that may be improved or corrected.

The process 700 may include an operation 730 of detecting that the textual content of the first editable node has been modified by a second text string, the second text string modifying at least a portion of the textual content associated with the first text string. As discussed in the preceding examples, the shadow graph 209 can be used to listen for modifications in the editable nodes of the webpage 201.

The process 700 may include an operation 740 of receiving the annotations from the server, the annotations comprising one or more suggestions for improving the text of the first text string. The writing intelligence services 150 are configured to provide annotations to the WAF 135 in response to a request for annotations. The annotations may include one or more suggestions for improving the spelling, grammar, style, and/or other attributes of the text.

The process 700 may include an operation 750 of updating the annotations to produce reconciled annotations by modifying the annotations to adapt to the modified textual content of the first editable node. The reconciled annotations may account for any changes in the location of the text associated with the annotations based on the user's subsequent editing of the contents of the editable node of the web page 201. The reconciled annotations may be produced using techniques like those discussed with respect to FIGS. 3 and 4.

The process 700 may include an operation 760 of rendering the reconciled annotations over at least a portion of the first editable node. The UXM 204 may be provided with the annotations that are to be displayed and the UXM 204 may be configured to render the annotations as an overlay to the contents of the webpage 201 according to the techniques discussed with respect to FIG. 2. The location where the reconciled annotations may be rendered may change based on the location information associated with the reconciled annotations. For example, the offset and/or span information may be different for the reconciled annotations than the original offset and/or span information was for the original set of annotations received in operation 740. The UXM 204 may take these differences into account when rendering the reconciled annotations. Furthermore, in some implementations, the UXM 204 may alternatively create a shadow DOM that represents the user interface elements of the reconciled annotations and may calculate the rendering parameters based on the shadow DOM before rendering the reconciled annotations on the webpage 201.

The range and selection APIs may not be available for use with all types of editable nodes. Some types of editable nodes do not support the range and selection APIs. For these types of elements, a shadow element may be created in a shadow DOM and the calculations for rendering on the webpage 201 may be performed on the shadow DOM elements. This approach may require that a timer to be set that triggers polling of contents of the inputs, since some elements have limited APIs available. The range API may be used on the shadow DOM to calculate the bounding box for the annotations, and the annotations may be rendered using a DIV like the technique discussed in the preceding example.

The detailed examples of systems, devices, and techniques described in connection with FIGS. 1-7 and 10, are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 and 10 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules may provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
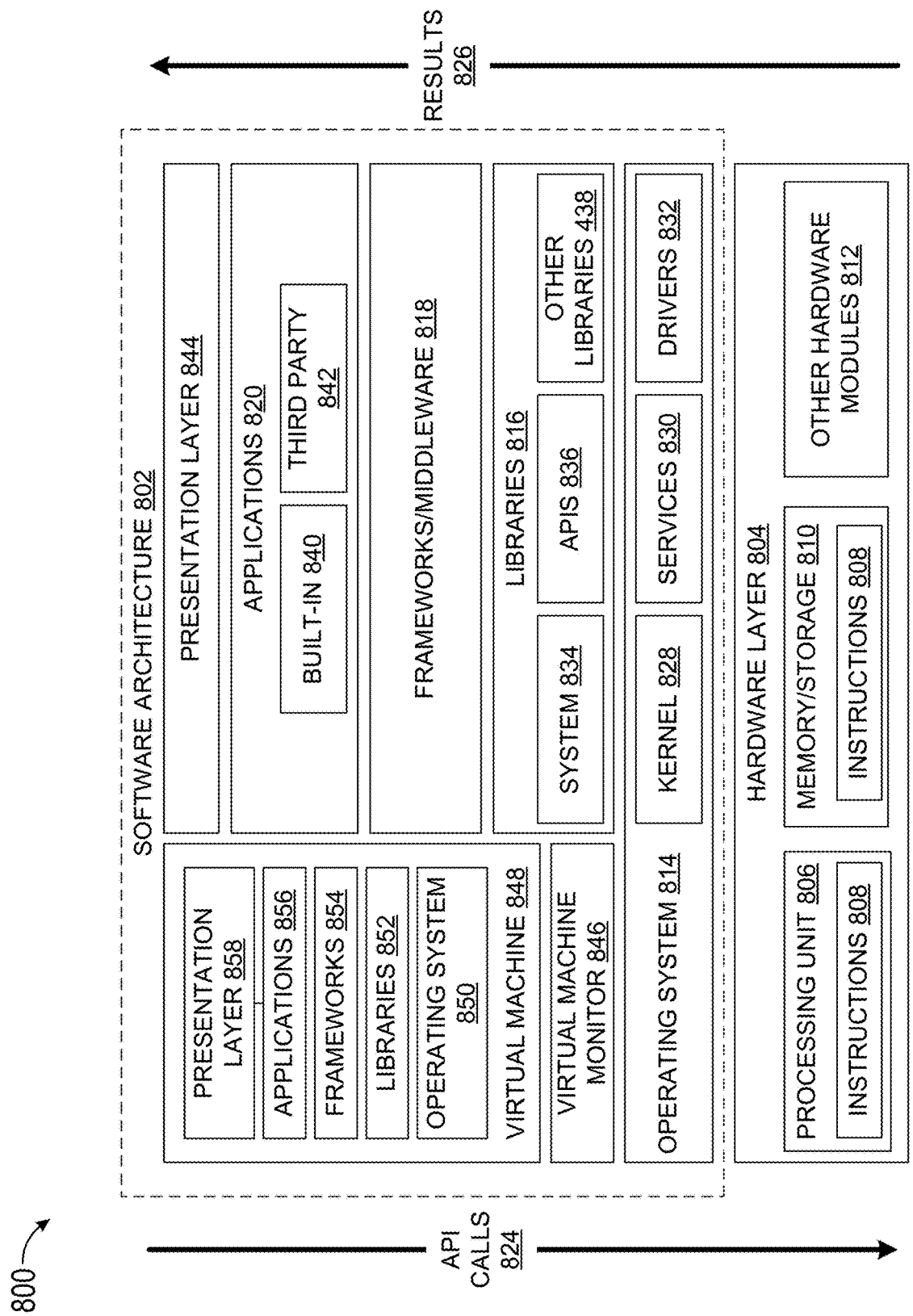
FIG. 8 is a block diagram illustrating an example software architecture, various portions of which may be used in conjunction with various hardware architectures herein described, which may implement any of the features herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 808 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 814, libraries 872, frameworks 854, applications 856, and/or a presentation layer 858.

Figure 9:
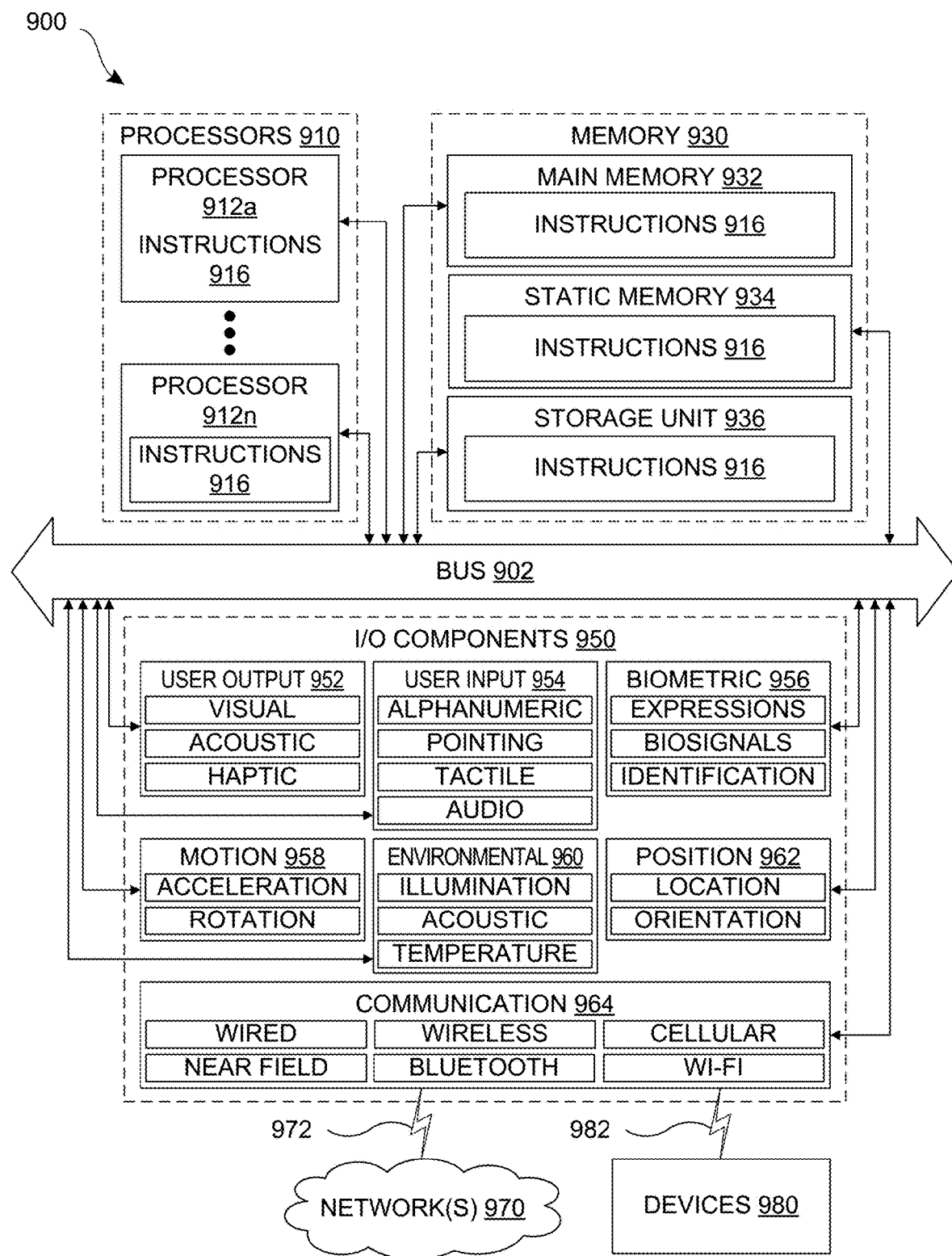
FIG. 9 is a block diagram illustrating components of an example machine configured to read instructions from a machine-readable medium and perform any of the features described herein.

FIG. 9 is a block diagram showing components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a computer-readable medium storing executable instructions for causing the processor to perform operations comprising:
   detecting that a webpage has been rendered by a web browser;
   analyzing a structure of the webpage to determine a topology of the webpage by accessing a Document Object Model (DOM) of the webpage and traversing the DOM of the webpage to identify nodes comprising the webpage to determine the topology of the webpage;
   construct a model of the webpage based on the topology of the webpage, wherein the model of the webpage is configured to automatically monitor the topology of the webpage and to update the model based on detected changes to the webpage;
   detect, using the model, a change in textual content of an input element of the webpage;
   obtain annotation information associated with the textual content on the webpage; and
   render the annotation information over at least a portion of the webpage displayed by the web browser.

2. The data processing system of claim 1, wherein to construct the model of the webpage the computer-readable medium further stores executable instructions for causing the processor to perform functions of:
   identifying nodes in the DOM representing textual input elements;
   constructing a subtree representing each textual input element of the webpage; and
   adding the subtree to the model of the webpage.

3. The data processing system of claim 2, to construct the subtree for a respective textual input element the computer-readable medium further stores executable instructions for causing the processor to perform functions of:
   generating an outline node as a root of the subtree that includes a reference to a corresponding node in the DOM that represents the respective textual input element; and
   generating one or more terminal nodes that represent at least a portion of textual content included in the respective textual input element.

4. The data processing system of claim 3, wherein to construct the subtree for a respective textual input element the computer-readable medium further stores executable instructions for causing the processor to perform functions of:
   dividing textual content of the textual input element into a plurality of sub-elements; and
   associating each sub-element with a terminal node of the subtree.

5. The data processing system of claim 4, wherein to detect the change in the textual content of the input element of the webpage the computer-readable medium further stores executable instructions for causing the processor to perform functions of:
   listening for DOM mutation events produced by the DOM of the webpage indicative of the textual content of the input element being changed responsive to user interactions with the webpage;

extracting the textual content of the input element from the DOM responsive to detecting a DOM mutation event;

dividing textual content of the textual input element into a plurality of updated sub-elements; and associating each updated sub-element with a terminal node of the subtree.

6. The data processing system of claim 5, wherein the computer-readable medium further stores executable instructions for causing the processor to perform operations including:

generating a request that includes at least a subset of the plurality of sub-elements of the updated textual content to a remote server to obtain annotation information identifying one or more improvements to the updated textual content; and receiving a response from the remote server that includes the annotation information, the annotation information comprising at least one suggested improvement to the updated textual content.

7. The data processing system of claim 6, wherein to render the annotation information over at least a portion of the webpage displayed by the web browser the computer-readable medium further stores executable instructions for causing the processor to perform functions of:

determining a type of annotation to be rendered based on the annotation information;

determining a location on the webpage over which the annotation information is to be rendered; and rendering a representation of the annotation information based on the annotation information and the determined location.

8. A method for providing writing assistance features in a web browser or native application including an embedded web browser, the method comprising:

detecting that a webpage has been rendered by the web browser;

analyzing a structure of the webpage to determine a topology of the webpage by accessing a Document Object Model (DOM) of the webpage and traversing the DOM of the webpage to identify nodes comprising the webpage to determine the topology of the webpage;

construct a model of the webpage based on the topology of the webpage, wherein the model of the webpage is configured to automatically monitor the topology of the webpage and to update the model based on detected changes to the webpage;

detect, using the model, a change in textual content of an input element of the webpage;

obtain annotation information associated with the textual content on the webpage; and render the annotation information over at least a portion of the webpage displayed by the web browser.

9. The method of claim 8, wherein constructing the model of the webpage further comprises:

identifying nodes in the DOM representing textual input elements;

constructing a subtree representing each textual input element of the webpage; and adding the subtree to the model of the webpage.

10. The method of claim 9, wherein constructing the subtree for a respective textual input element comprises:

generating an outline node as a root of the subtree that includes a reference to a corresponding node in the DOM that represents the respective textual input element; and generating one or more terminal nodes that represent at least a portion of textual content included in the respective textual input element.

11. The method of claim 10, wherein constructing the subtree for a respective textual input element comprises:

dividing textual content of the textual input element into a plurality of sub-elements; and associating each sub-element with a terminal node of the subtree.

12. The method of claim 11, wherein detecting the change in the textual content of the input element of the webpage further comprises:

listening for DOM mutation events produced by the DOM of the webpage indicative of the textual content of the input element being changed responsive to user interactions with the webpage;

extracting the textual content of the input element from the DOM responsive to detecting a DOM mutation event;

dividing textual content of the textual input element into a plurality of updated sub-elements; and associating each updated sub-element with a terminal node of the subtree.

13. The method of claim 12, further comprising:

generating a request that includes at least a subset of the plurality of sub-elements of the updated textual content to a remote server to obtain annotation information identifying one or more improvements to the updated textual content; and receiving a response from the remote server that includes the annotation information, the annotation information comprising at least one suggested improvement to the updated textual content.

14. The method of claim 13, wherein to render the annotation information over at least a portion of the webpage displayed by the web browser further comprises:

determining a type of annotation to be rendered based on the annotation information;

determining a location on the webpage over which the annotation information is to be rendered; and rendering a representation of the annotation information based on the annotation information and the determined location.

15. A memory device storing instructions that, when executed on a processor of a data processing system, cause the data processing system to provide writing assistance features in a web browser or a native application including an embedded web browser, by:

detecting that a webpage has been rendered by the web browser;

analyzing a structure of the webpage to determine a topology of the webpage by accessing a Document Object Model (DOM) of the webpage and traversing the DOM of the webpage to identify nodes comprising the webpage to determine the topology of the webpage;

construct a model of the webpage based on the topology of the webpage, wherein the model of the webpage is configured to automatically monitor the topology of the webpage and to update the model based on detected changes to the webpage;

detect, using the model, a change in textual content of an input element of the webpage;

obtain annotation information associated with the textual content on the webpage; and render the annotation information over at least a portion of the webpage displayed by the web browser.

16. The memory device of claim 15, wherein to construct the model of the webpage the memory device further stores executable instructions for causing the processor to perform functions of:

identifying nodes in the DOM representing textual input elements;

constructing a subtree representing each textual input element of the webpage; and adding the subtree to the model of the webpage.

17. The memory device of claim 16, to construct the subtree for a respective textual input element the memory device further stores executable instructions for causing the processor to perform functions of:

generating an outline node as a root of the subtree that includes a reference to a corresponding node in the DOM that represents the respective textual input element; and generating one or more terminal nodes that represent at least a portion of textual content included in the respective textual input element.

18. The memory device of claim 17, wherein to construct the subtree for a respective textual input element the memory device further stores executable instructions for causing the processor to perform functions of:

dividing textual content of the textual input element into a plurality of sub-elements; and associating each sub-element with a terminal node of the subtree.

19. The memory device of claim 18, wherein to detect the change in the textual content of the input element of the webpage the memory device further stores executable instructions for causing the processor to perform functions of:

listening for DOM mutation events produced by the DOM of the webpage indicative of the textual content of the input element being changed responsive to user interactions with the webpage;

extracting the textual content of the input element from the DOM responsive to detecting a DOM mutation event;

dividing textual content of the textual input element into a plurality of updated sub-elements; and associating each updated sub-element with a terminal node of the subtree.

20. The memory device of claim 19, wherein the memory device further stores executable instructions for causing the processor to perform operations including:

generating a request that includes at least a subset of the plurality of sub-elements of the updated textual content to a remote server to obtain annotation information identifying one or more improvements to the updated textual content; and receiving a response from the remote server that includes the annotation information, the annotation information comprising at least one suggested improvement to the updated textual content.

* * * * *